US005406346A

United States Patent [19]
Hayakawa

[11] Patent Number: 5,406,346
[45] Date of Patent: Apr. 11, 1995

[54] ADAPTOR FOR FILM CARTRIDGE

[75] Inventor: Masahiro Hayakawa, Tokyo, Japan

[73] Assignee: Asahi Kogaku Kogyo Kabushiki Kaisha, Tokyo, Japan

[21] Appl. No.: 49,861

[22] Filed: Apr. 20, 1993

[30] Foreign Application Priority Data

| Apr. 20, 1992 | [JP] | Japan | 4-126822 |
| Apr. 20, 1992 | [JP] | Japan | 4-126823 |
| Apr. 21, 1992 | [JP] | Japan | 4-128102 |
| Apr. 21, 1992 | [JP] | Japan | 4-128103 |
| Apr. 24, 1992 | [JP] | Japan | 4-131708 |
| Apr. 24, 1992 | [JP] | Japan | 4-131709 |
| Apr. 24, 1992 | [JP] | Japan | 4-131710 |
| Apr. 24, 1992 | [JP] | Japan | 4-131711 |

[51] Int. Cl.$^6$ ............................................. G03B 17/26
[52] U.S. Cl. .................................... 354/275; 354/288
[58] Field of Search ............... 354/203, 275, 276, 279, 354/288

[56] References Cited

U.S. PATENT DOCUMENTS

| 4,281,913 | 8/1981 | Shono et al. | 354/203 |
| 4,579,432 | 4/1986 | Kobayashi | 354/21 |
| 4,952,954 | 8/1990 | Kitazawa | 354/173.1 |
| 5,040,010 | 8/1991 | Arai | 354/288 |

FOREIGN PATENT DOCUMENTS

| 2154246 | 6/1990 | Japan | 354/275 |
| 3246527 | 11/1991 | Japan | 354/275 |
| 9206405 | 4/1992 | WIPO | 354/275 |

Primary Examiner—Howard B. Blankenship
Attorney, Agent, or Firm—Sandler, Greenblum & Bernstein

[57] ABSTRACT

An adaptor supports a patrone having a small diameter so as to adapt the patrone for use in a patrone chamber of a camera. The adaptor includes a supporting portion for supporting the patrone of small diameter and a positioning portion that engages with at least one portion of the patrone chamber.

33 Claims, 27 Drawing Sheets

ADAPTOR FOR FILM CARTRIDGE

BACKGROUND OF THE INVENTION

1. Field of the Invention

The present invention relates to an adaptor which is attached to a small diameter film patrone (i.e., film cartridge or magazine) whose diameter is smaller than that of a patrone chamber of a camera.

2. Description of Related Art

To miniaturize a camera, it is theoretically possible to use a small diameter film patrone whose diameter is smaller than that of the conventional JIS 135 type patrone.

To load such a small diameter film patrone in a conventional camera or developer (i.e., film developing machine) designed for the JIS 135 type patrone, it is necessary to use an adaptor which compensates for the difference in diameter between the small diameter patrone and the JIS 135 type patrone.

Some photographers may use the small diameter patrone only, while others may alternately use the small diameter patrone and the JIS 135 type patrone for the same camera. In the case that only the small diameter patrone is used, the adaptor can be permanently incorporated in the patrone chamber of the camera.

On the other hand, in the case that the small diameter patrone and the JIS 135 type patrone are alternately used, the adaptor is attached to the small diameter patrone when the small diameter patrone is to be used, so that the adaptor together with the small diameter patrone can be accommodated in the patrone chamber of the camera.

In the first case mentioned above, it is necessary to prevent the adaptor from accidentally coming out of the patrone chamber. The same is also true when the small diameter patrone is used in a conventional developer for the JIS 135 type patrone. In the second case, it is necessary to prevent the small diameter patrone from being easily detached from the adaptor.

The JIS 135 type patrone is provided on the outer peripheral surface thereof with a film information indicating portion, represented by printed letters, such as film sensitivity data or the number of frames of the film loaded in the patrone. A similar information indicating portion may be provided on the outer peripheral surface of the small diameter patrone.

A camera is also known which is designed for the JIS 135 type patrone, in which the back cover of the camera is provided with a transparent information indicating window, so that the information of the indicating portion of the JIS 135 type patrone loaded in the patrone chamber can be viewed from the outside of the camera when the back cover is closed.

Accordingly, in the case where the small diameter patrone is loaded in the patrone chamber of a camera having an information window on the back cover, it would be convenient if the information of the indicating portion of the small diameter patrone could be viewed through the information indicating window after the back cover is closed.

However, if the adaptor, which compensates for the diameter difference between the small diameter patrone and the JIS 135 type patrone, is provided between the small diameter patrone and the patrone chamber of the camera, information regarding the small diameter patrone will not be visible from the outside of the camera, since the small diameter patrone will be substantially enclosed in the adaptor.

In a known camera, a film guide adjacent to an open inlet of the patrone chamber of the camera is provided to guide the film withdrawn from the patrone. Particularly, in a conventional camera which uses the JIS 135 type patrone, when the patrone is loaded in the patrone chamber of the camera, it is positioned so that a film outlet of the JIS 135 type patrone is oriented toward an extension of the film guide.

Consequently, when the JIS 135 type patrone is loaded in the patrone chamber of the conventional camera designed for the JIS 135 type patrone, the film withdrawn from the patrone through the film outlet thereof can be stably advanced, i.e., the film can be fed without becoming misaligned or bent. Stable advancement of the film not only contributes to a reduction of the winding or rewinding force of the film, but also protects the film surface from being damaged.

However, if the small diameter patrone housed in the adaptor is loaded in the patrone chamber of the conventional camera designed to receive the JIS 135 type patrone, the film outlet of the small diameter patrone will not align with the film outlet of the JIS 135 type patrone in the patrone chamber, since a rewinding fork projecting into the patrone chamber is located at a fixed position.

To this end, when the small diameter patrone housed in the adaptor is loaded in the patrone chamber of the conventional camera which uses the JIS 135 type patrone, it is necessary to prevent the film withdrawn from the small diameter patrone from winding or being bent.

In a known camera, film guide projections are provided along a passage of the film withdrawn from the patrone and wound onto a winding spool to prevent the film surface from being damaged and to retain the flatness of the film. The film guide projections come into contact with the portion of the film other than the picture plane on opposite sides of the film during the passage of the film on the guide projections. Since the picture plane of the film does not come into contact with the guide projections, the picture plane can be prevented from being damaged.

To this end, when the small diameter patrone is loaded in the patrone chamber of the camera, using the adaptor, it is necessary to space the picture plane portion of the film, withdrawn from the small diameter patrone, from the adaptor.

Some photographers may use the small diameter patrone only. In such a case, the adaptor for the small diameter patrone can be conveniently and permanently fitted in the patrone chamber of the camera. With this arrangement, the small diameter patrone can be inserted in the permanent adaptor.

To this end, it is necessary to provide an opening on the adaptor through which the small diameter patrone can be inserted.

However, in the case that the small diameter patrone is accommodated in the patrone chamber of a conventional camera designed for the JIS 135 type patrone, using the adaptor having the insertion opening, a gap exists between the outer peripheral surface of the small diameter patrone and the back cover provided on the camera to open and close the patrone chamber in the vicinity of the insertion opening of the adaptor, since the position of the rewinding fork projecting into the patrone chamber is fixed. Consequently, the small diameter patrone can be easily and accidentally detached and drop from the adaptor.

The JIS 135 type patrone is usually provided, on the outer peripheral surface thereof, with a film information contact portion including conductor portions and insulating portions.

The patrone chamber of the camera is provided, on the inner wall surface thereof, with a film information contact portion including a plurality of contacts which can be connected to the film information contact portion of the JIS 135 type patrone.

When the JIS 135 type patrone is received in the patrone compartment of the camera, the film information contact portion of the patrone is connected to the film information terminal portion of the patrone chamber to establish an electrical connection between the terminals of the film information terminal portion which are connected to the conductor portions of the film contact information portion. Accordingly, film information, such as film sensitivity (i.e., film-speed) of film contained in the JIS 135 type patrone, which is received in the patrone chamber, can be automatically detected on the camera body side in accordance with the conductor pattern.

To this end, it is necessary to provide a film information contact portion on the outer peripheral surface of the small diameter patrone, similar to the JIS 135 type patrone, so that when the small diameter patrone is loaded in the patrone chamber using the adaptor, film information can be automatically detected.

However, when the small diameter patrone is loaded in the patrone chamber of a camera designed for the JIS 135 type patrone, using the adaptor, a gap corresponding to a difference in diameter between the JIS 135 type patrone and the small diameter patrone exists between the outer peripheral surface of the small diameter patrone and the inner wall surface of the patrone chamber, since the rewinding fork provided in the patrone chamber is located at a fixed position.

Consequently, even if the film information contact portion is provided on the outer peripheral surface of the small diameter patrone, similar to the JIS 135 type patrone, the film information contact portion does not contact the film information terminal portion of the patrone chamber. Moreover, since the adaptor is located between the film information contact portion of the small diameter patrone and the film information terminal portion of the patrone chamber, film information of the small diameter patrone, such as film-speed, etc., cannot be automatically detected by the camera body side.

When the small diameter patrone is received in the patrone chamber of a camera designed for the JIS 135 type patrone, a gap, which exists between the outer peripheral surface of the small diameter patrone and the inner wall surface of the patrone chamber, makes it impossible to stably hold the small diameter patrone in the patrone chamber while engaging the winding shaft of the small diameter patrone with the rewinding fork of the patrone chamber.

In addition to the foregoing, since the position of the film outlet of the small diameter patrone is not identical to that of the film outlet of the JIS 135 type patrone in the patrone chamber, a winding or bending of the film drawn from the small diameter patrone towards the winding spool takes place, thus resulting in an increase of the winding or rewinding force of the film or damage to the film surface.

SUMMARY OF THE INVENTION

The primary object of the present invention is to provide an adaptor for a small diameter patrone, wherein the adaptor is prevented from being detached from a patrone chamber of an associated camera and the small diameter patrone is prevented from being detached from the adaptor.

To achieve the object mentioned above, according to the present invention, there is provided an adaptor which supports a patrone having a small diameter so as to adapt the patrone for use in a patrone chamber of a camera. The adaptor comprises a supporting portion for supporting the patrone having a small diameter, and a positioning portion that engages with at least one portion of the patrone chamber. Preferably, a slip preventing mechanism is provided between the adaptor and the small diameter patrone, and between the adaptor and the patrone chamber.

Another object of the present invention is to provide an adaptor between a patrone chamber of a camera and a small diameter patrone to be held in the adaptor. The adaptor includes a patrone holding portion which is accommodated in the patrone chamber and which holds therein the small diameter patrone, and a lid portion which is swingably connected to the patrone holding portion to open and close an insertion opening. The insertion opening is provided on the patrone holding portion, so that the small diameter patrone can be inserted therethrough.

A further object of the present invention is to provide an adaptor provided between an inner wall surface of a patrone chamber and an outer peripheral surface of a small diameter patrone. The patrone chamber is provided on the inner wall surface thereof with a film information terminal portion. The small diameter patrone is provided on the outer peripheral surface thereof with a film information contact portion. The film information terminal portion of the patrone chamber and the film information contact portion of the small diameter patrone are connected by a connecting mechanism.

A still further object of the present invention is to provide a camera having a patrone chamber in which a patrone .can be received, wherein the camera includes a holder which is capable of supporting patrones of various diameters.

The present disclosure relates to subject matter contained in Japanese patent application Nos. 04-126822, 04-126823 (filed on Apr. 20, 1992), 04-128102, 04-128103 (filed on Apr. 21, 1992), 04-131708, 04-131709, 04-131710, and 04-131711 (filed on Apr. 24, 1992) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
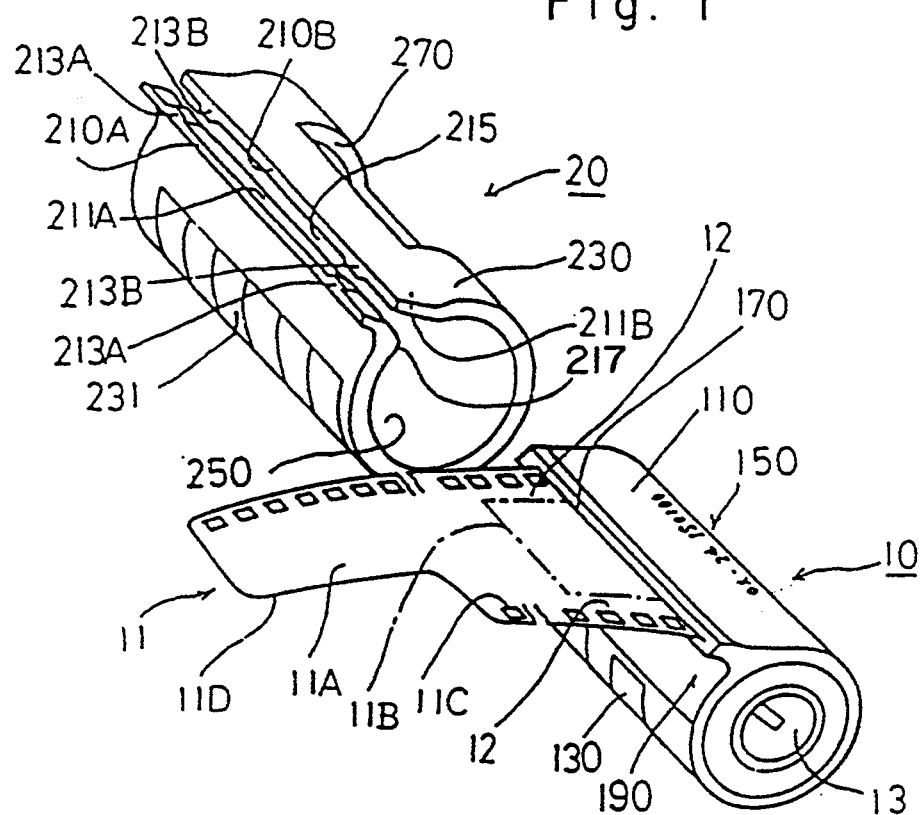
FIG. 1 is a perspective view of a small diameter patrone and an adaptor to be mounted thereto, according to a first embodiment of the present invention.

FIG. 1 shows a small diameter patrone and an adaptor to be mounted to the small diameter patrone, according to a first embodiment of the present invention.

In FIG. 1, a small diameter patrone 10 whose size is smaller than the conventional JIS 135 type patrone (not shown) has a winding shaft 13 whose diameter is identical to that of the JIS 135 type patrone. The small diameter patrone 10 is provided on the outer peripheral surface 110 thereof with a film information contact 130 having an electrically coded conductor pattern representing film information, such as film sensitivity data, etc., an indicating portion 150 on which letters representing information, such as the number of frames of the film or the film sensitivity are printed, and a film outlet 170 which projects in the tangential direction of the circular patrone. A recess 190 is also provided on the outer peripheral surface 110 of the small diameter patrone 10 to be connected to the film outlet 170.

An adaptor 20 for the small diameter patrone is mounted to the outer peripheral surface 110 of the small diameter patrone 10. The adaptor 20 makes it possible to load the small diameter patrone 10 in a patrone chamber 310 of a conventional camera 30 (discussed hereinafter) designed for the JIS 135 type patrone. Accordingly, the patrone chamber 310 is shaped so that the adaptor, with the small diameter patrone mounted thereto, can be loaded in the patrone chamber 310.

The flexible adaptor 20 is made of, for example, a generally C-shaped (in cross section) resin tube, so that it is elastically deformable. The inner diameter of the adaptor 20 is slightly smaller than the outer diameter of the small diameter patrone 10.

The adaptor 20 is provided, on opposite ends thereof in the circumferential direction, with end projections 210A and 210B which define a film outlet 215 of the film 11 withdrawn from the small diameter patrone 10. One of the end projections 210A and 210B, e.g., the projection 210B projects in the tangential direction of the tubular adaptor 20, while the other end projection 210A is bent and extends in substantially the same direction as (i.e. parallel to) the end projection 210B. The adaptor 20 is provided on the inner peripheral surface 250 thereof with a projecting abutment 217 at the bent portion of the end projection 210A.

The end projections 210A and 210B are provided on the inner surfaces 211 (211A, 211B) thereof, opposed to each other, with guide rails 213 (213A and 213B) with which the side edges (i.e., perforated portion) 12 of the film 11, located out of the picture plane area (i.e., emulsion area), can come into contact.

Figure 2:
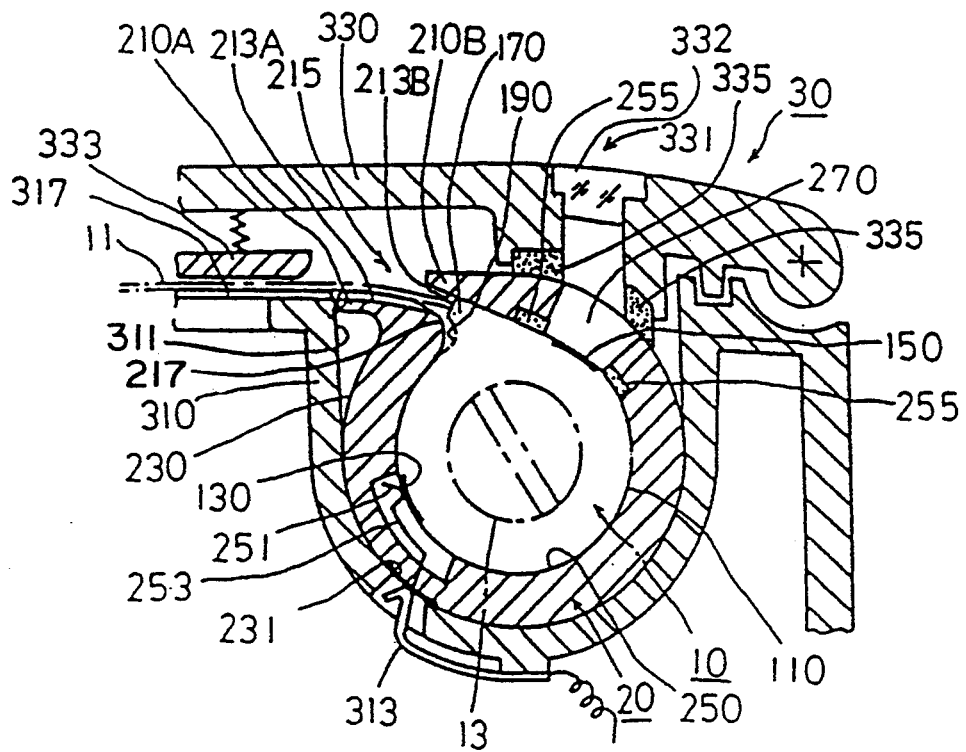
FIG. 2 is an enlarged sectional view of an adaptor mounted to a small diameter patrone, a shown in FIG. 1, and loaded in a patrone chamber of a camera designed for a JIS 135 type patrone.

FIG. 2 shows an enlarged sectional view of the adaptor 20, as shown in FIG. 1, loaded in the patrone chamber 310 of the camera 30 for the JIS 135 type patrone, together with the small diameter patrone 10 which is fitted in the adaptor 20.

As can be seen in FIG. 2, the patrone chamber 310 of the camera 30 is generally of U-shape in cross section, and is provided on the inner wall surface thereof with a film information terminal 313 which can be brought into contact with the film information contact provided on the outer surface of the JIS 135 type patrone (not shown). The film information terminal 313 slightly projects from the inner surface of the patrone chamber 310.

The back cover 330 of the camera 30 which opens and closes the opening of the patrone chamber 310 is provided with an information indicating window 331 and a pressure plate 333. Information (not shown) printed on the outer surface of the JIS 135 type patrone, including the film sensitivity or the number of frames of the film, etc., can be viewed through the information indicating window 331 from outside of the camera 30. The information indicating window 331 is located on the portion of the back cover 330 that faces the indicating portion (i.e., information portion) of the JIS 135 type patrone when the latter is loaded in the patrone chamber 310.

The camera body 30 is provided with film guides 317 on the portion thereof that are opposed to the pressure plate 333 of the back cover 330 and connected to the patrone chamber 310. The film guides 317 come into slide contact with the side edges of the film 11 outside the picture plane area thereof.

The information indicating window 331 is enclosed with a transparent plastic or glass plug 332 at the outer end of the information indicating window 331 (i.e., outer surface of the back cover 330). A light intercepting member 335, made of an elastic material, is provided at the inner open end of the information indicating window 331 to surround the latter. When the back cover 33 is closed, the light intercepting member 335 is elastically depressed against the outer surface of a JIS 135 type patrone loaded in the patrone chamber 310.

The adaptor 20 has an outer diameter substantially identical to that of the JIS 135 type patrone, so that the adaptor 20 can be fitted in the patrone chamber, similar to the JIS 135 type patrone. The adaptor 20 is provided on the outer surface 230 thereof with a communication contact 231 which can be brought into contact with the film information terminal 313.

As shown in FIG. 2, the adaptor 20 has an intermediate window 270 which extends through the adaptor 20 from the outer surface 230 to the inner surface 250. The intermediate window 270 is provided on the portion of the adaptor 20 that is located between the information indicating window 331 of the back cover 330 of the camera 30 and the indicating portion 150 of the small diameter patrone 10. Consequently, the information of the indicating portion 150 of the small diameter patrone 10 can be viewed from the outside of the camera 30 through the intermediate window 270 and the information indicating window 331 of the camera 30.

As can be seen in FIG. 2, the adaptor 20 is provided on the inner surface 250 thereof with a light intercepting member 255 made of an elastic material to surround the intermediate window 270. When the small diameter patrone 10 is fitted in the adaptor 20, the light intercepting member 255 is elastically depressed against the circumferential portion of the indicating portion 150 provided on the outer surface 110 of the small diameter patrone 10.

The light intercepting member 255 intercepts light incident upon the intermediate window 270 of the adaptor 20 or the information indicating window 331, so as not to expose the portion of the film 11 drawn out from the small diameter patrone 10. The light intercepting member 255 also serves as a slip preventing means for preventing motion between the inner surface 250 of the adaptor 20 and the outer surface 110 of the small diameter patrone 10.

The adaptor 20 is provided on the inner surface 250 thereof with a connecting terminal 251 which can be brought into contact with the film information contact 130 of the small diameter patrone 10. The connecting terminal 251 and the contact 231 are electrically interconnected by an electrical conductor (lead) 253, as can be seen in FIG. 2.

The end projections 210A and 210B of the adaptor 20 define the film outlet 215 which introduces the film portion withdrawn from the film outlet 170 of the small diameter patrone 10 into the film guides 317 of the camera 30 located outside the adaptor 20, as mentioned above.

Moreover, the end projections 210A and 210B are provided, on the respective inner surfaces 211A and 211B thereof, with the guide rails 213A and 213B which are of generally trapezoidal shape in cross section. The guide rails 213A and 213B are brought into contact with the opposite side edges 12 of the film 11 outside the picture plane area 11B of the film surface 11A and inside the perforations 11C when the film 1 passes through the film outlet 215, as shown in FIG. 1.

When the adaptor 20 as constructed above is used, the space between the end projections 210A and 210B of the adaptor 20 is slightly expanded to increase the inner diameter of the adaptor 20, so that the small diameter patrone 10 can be easily inserted in the adaptor 20. When the external force to expand the gap between the end projections 210A and 210B of the adaptor 20 is released, the outer peripheral surface 110 of the small diameter patrone 10 is firmly held by the inner peripheral surface of the adaptor 20, owing to the elastic force of the adaptor 20.

As can be understood from the above discussion, according to the first embodiment of the present invention, since the small diameter patrone 10 is firmly held by the adaptor 20, and the light intercepting member 255 of the adaptor 20 is elastically depressed against the outer surface 110 of the small diameter patrone 10, no slip occurs between the inner surface 250 of the adaptor 20 and the outer surface 110 of the small diameter patrone 10, thus preventing accidental detachment of the small diameter patrone 10 from the adaptor 20.

In the illustrated embodiment, although the light intercepting member 255 also functions as a slip preventing means, as mentioned above, it is possible to provide a separate elastic slip preventing member on the inner surface 250 of the adaptor 20.

In this alternative, the small diameter patrone 10 can be held by the separate elastic slip preventing member provided on the inner surface 250 of the adaptor 20, unlike the illustrated embodiment in which the small diameter patrone 10 is directly held by the inner surface 250 of the adaptor 20.

When the adaptor 20 is loaded in the patrone chamber 310, the abutment 217 of the adaptor 20 is engaged in the recess 190 of the small diameter patrone 10, and the end projection 210A of the adaptor 20 abuts against the inner wall surface portion 311 of the patrone chamber 310 connected to the film guide 317 of the camera 30, so that the film outlet 215 of the adaptor 20 is oriented towards end 317A of the film guide 317 adjacent to the patrone chamber 310.

According to the first embodiment, when the adaptor 20, in which the small diameter patrone 10 is fitted, is accommodated in the patrone chamber 310 of the camera 30, the film outlet 215 of the adaptor 20 faces the end 317A of the film guide 317 adjacent to the patrone chamber 310, as mentioned above. Accordingly, the film outlet 170 of the small diameter patrone 10 is oriented towards end 317A of the film guide 317. Consequently, the film portion 11, withdrawn from the film outlet 170, is moved directly to the film guide 317. Thus, the film is maintained relatively straight during the feeding operation thereof. Accordingly, neither an increase of the winding or rewinding force nor damage of the film surface occurs.

When the film 11 passes through the film outlet 215 of the adaptor 20, the edge portions 12 of the film 11 come into sliding contact with the guide rails 213A provided on the end projection 210A of the adaptor 20 or both the guide rails 213A and 213B of the end projections 210A and 210B, so that the picture plane area 11B (FIG. 1) of the film 11 is spaced from the inner surfaces 211 (211A and 211B) of the end projections 210A and 210B (film outlet 215), thus preventing the picture plane area 11b from contacting the inner surfaces 211A and 211B. As a result, the picture plane area 11b is prevented from being damaged.

As can be seen from the above discussion, according to the first embodiment of the present invention, when the film 11 of the small diameter patrone 10, which is fitted in the adaptor 20 that is loaded in the patrone chamber 310 of the camera 30, is wound or rewound from or into the small diameter patrone 10, the edge portions 12 of the film 11, outside the picture plane area 11B, come into sliding contact with the guide rails 213A or the guide rails 213A and 213B. Consequently, the picture plane area 11B of the film plane 11A of the film 11 does not contact the inner surfaces 211A and 211B of the end projections 210A and 210B that define the film outlet 215, preventing the picture plane area 11B from being damaged during the passage of the film through the film outlet 215.

Figure 3:
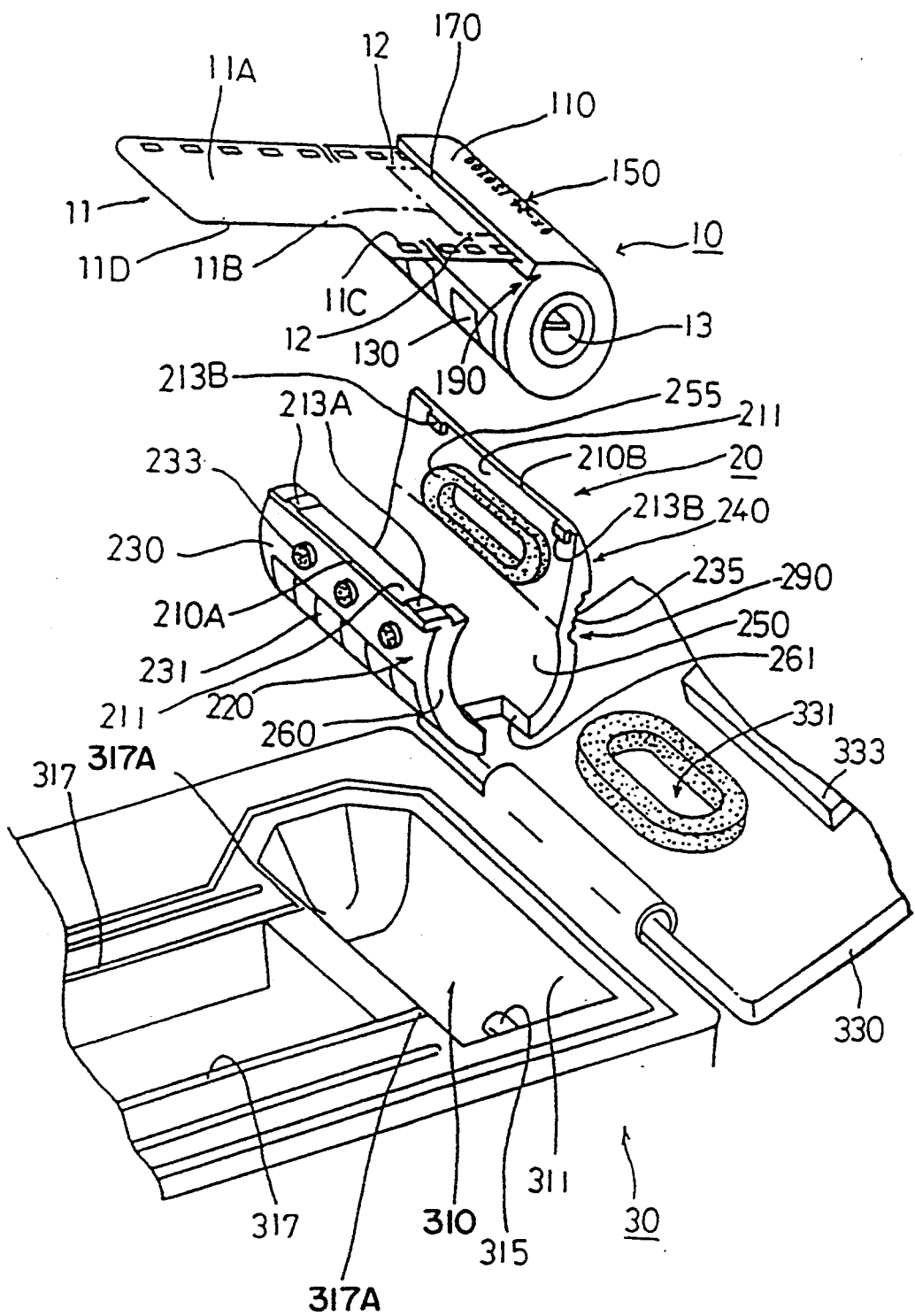
FIG. 3 is a perspective view of a patrone chamber of a camera designed for a JIS 135 type patrone and an adaptor for a small diameter patrone to be loaded in the patrone chamber, according to a second embodiment of the present invention.
Figure 4:
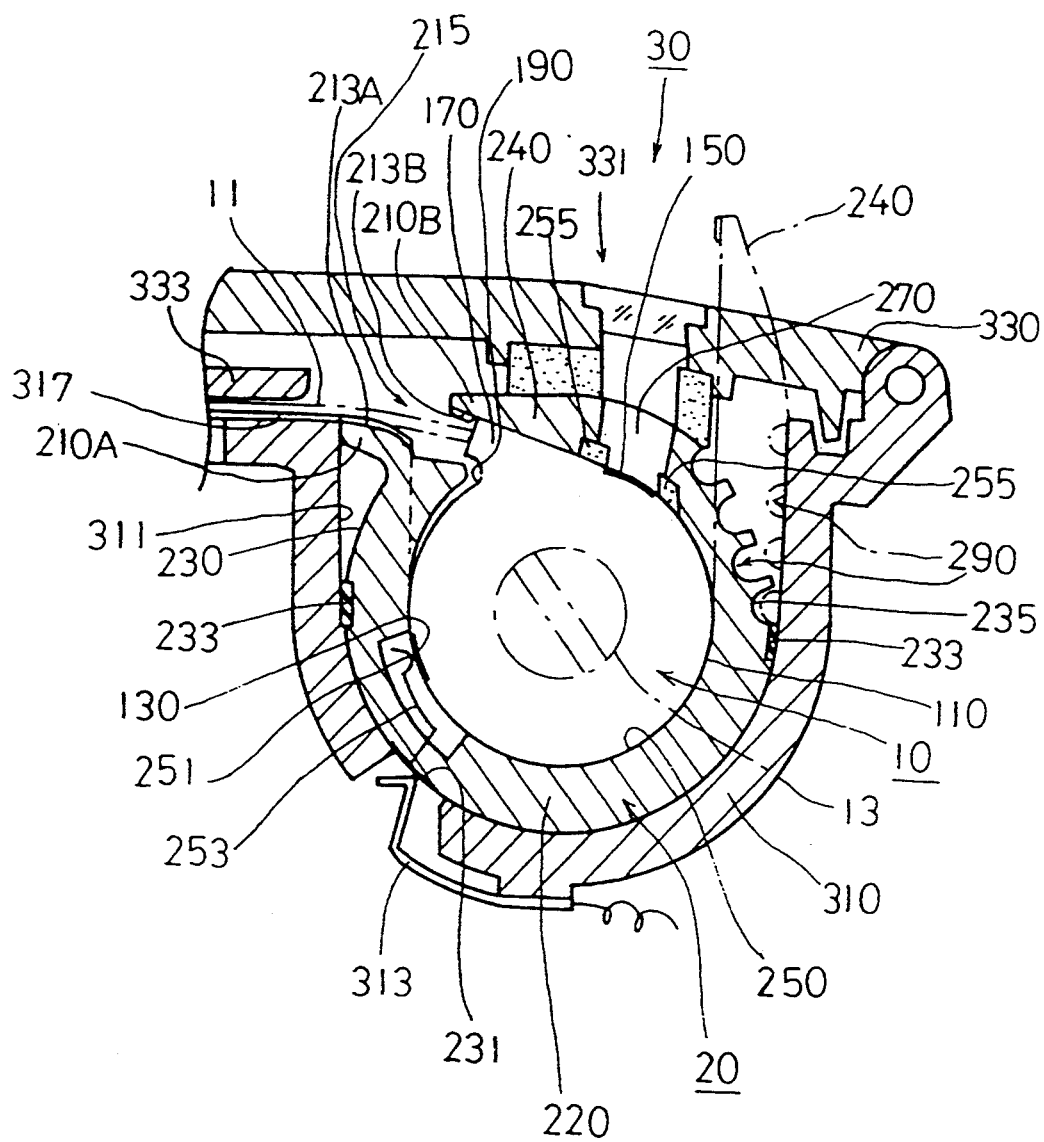
FIG. 4 is an enlarged sectional view of an adaptor mounted to a small diameter patrone, as shown in FIG. 3, and loaded in a patrone chamber of a camera designed for a JIS 135 type patrone.
Figure 5:
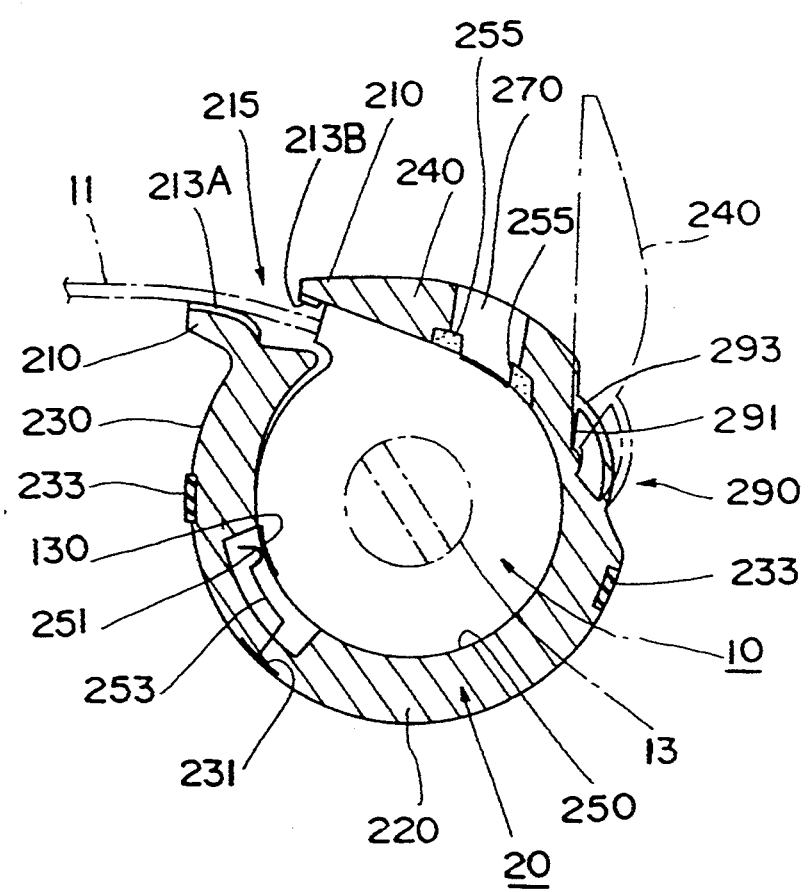
FIG. 5 is an explanatory view of another embodiment of a hinge portion of an adaptor shown in FIG. 4.

The following discussion will be directed to a second embodiment of the present invention with reference to FIGS. 3 and 4.

In FIGS. 3 and 4, the components corresponding to those in the first embodiment shown in FIGS. 1 and 2 are designated with like numerals and no detailed explanation thereof will be given herein.

The adaptor 20, as shown in FIG. 3, is applied to a camera designed for the JIS 135 type patrone in which only the small diameter patrone 10 is used. Namely, the adaptor 20 is permanently incorporated in the patrone chamber 310 of the camera 30, so that only the small diameter patrone 10 can be loaded in the adaptor 20.

In FIG. 3, numeral 233 designates slip preventing members (projections) made of an elastic material and provided on the outer surface 230 of the adaptor 20. As can be seen in FIG. 4, when the adaptor 20 is fitted in the patrone chamber 310 of the camera 30, the slip preventing members are elastically and strongly depressed on the inner wall surface 311 of the patrone chamber 310, and are firmly held therein.

Numeral 235 designates grooves formed in the outer surface 230 of the adaptor 20 to form a hinge 290 having a smaller thickness. The adaptor 20 has a generally U-shaped patrone receiving portion 220 and a lid portion 240 connected to the patrone receiving portion 220 by the hinge 290. The adaptor 20 can be bent at the hinge 290, so that the lid portion 240 is bent to cover the patrone receiving portion 220.

Numeral 261 designates a recess formed in the lower end 260 of the patrone receiving portion 220, so that when the adaptor 20 is accommodated in the patrone chamber 310 of the camera 30, the rewinding fork 315 of the patrone chamber 310 does not interfere with the adaptor 20. Namely, if there was no recess 261, the adaptor 20 could not be inserted in the patrone chamber 310, since the rewinding fork 315 would interfere with the lower end (bottom) of the adaptor 20.

In the second embodiment illustrated in FIGS. 3 and 4, the slip preventing members 233, provided on the outer surface 230 of the adaptor 20, constitute a slip preventing means for preventing movement between the adaptor 20 and the patrone chamber 310.

The adaptor 20, as shown in FIGS. 3 and 4, is provided with intermediate window 270 and light intercepting member 255 on the inner surface 250 of the lid portion 240.

Upon assembling, the recess 261 of the patrone receiving portion 220 is registered or aligned with the rewinding fork 315 of the patrone chamber 310 of the camera 30 and the patrone receiving portion 220 of the adaptor 20 is inserted and received in the patrone chamber 310.

Thereafter, the lid portion 240 of the adaptor 20 is opened, so that the small diameter patrone 10 can be fitted in the patrone receiving portion 220 of the adaptor 20, as shown at a phantom line in FIG. 4. Thereafter, the lid portion 240 is closed as shown at a solid line in FIG. 4, and the leading end lid (FIG. 3) of the film withdrawn from the small diameter patrone 10 through the film outlet 170 is further drawn from the film outlet 215 of the adaptor 20 to wind the leading end 11D of the film 11 about the winding spool (not shown) of the camera 30. In this state, the slip preventing members 233 of the adaptor 20 are strongly depressed against the inner wall surface 311 of the patrone chamber 310.

As can be seen from the above discussion, since the slip preventing members 233 of the adaptor 20 are strongly depressed against the inner wall surface 311 of the patrone chamber 310, movement between the outer surface 230 of the adaptor 20 and the inner wall surface 311 of the patrone chamber 310 does not occur. Accordingly, accidental detachment of the adaptor 20 from the patrone chamber 310 is prevented.

Although the slip preventing members 233 are made of an elastic material in the illustrated embodiment, if the inner wall 311 of the patrone chamber 310 is made of a magnetically attractive material, it is possible to provide magnetic slip preventing members 233. Alternatively, it is possible to attach an adhesive portion having a relatively weak adhesive force to the outer surface 230 of the adaptor 20, in place of the elastic or magnetic slip preventing member(s) 233.

When the lid portion 240 is closed, the indicating portion 150 of the small diameter patrone 10 is opposed to the intermediate window 270 of the adaptor 20, similar to the first embodiment. Moreover, the light intercepting member 255 is depressed against the periphery of the indicating portion 150 of the small diameter patrone 10. When the back cover 330 of the camera body 30 is closed, the intermediate window 270 of the adaptor 20 faces the information indicating window 331 of the camera 30.

Consequently, in the adaptor 20 of the second embodiment, the indicating portion 150 of the small diameter patrone 10 is opposed to the information indicating window 331 of the camera 30 through the intermediate window 270. Accordingly, information of the indicating portion 150 can be viewed from the outside of the camera 30 through the information indicating window 331 of the back cover 330 and the intermediate window 270 of the adaptor 20, similar to the adaptor 20 of the first embodiment.

The space between the outer peripheral surface 110 of the small diameter patrone 10 and the outer peripheral surface 230 of the adaptor 20, at the intermediate window 270, is enclosed by the annular light intercepting member 255. Accordingly, light which would otherwise enter the adaptor 20 through the information indicating window 331 or the intermediate window 270, etc., from the outside of the camera 30 is intercepted so as not to expose the film portion withdrawn from the small diameter patrone 10.

The intermediate window 270, in the first and second embodiments, can be a hole, or a hole having a transparent glass or plastic plug fitted therein, similar to the back cover 330 or the information indicating window 331.

Similar to the first embodiment, the end projection 210A of the adaptor 20 abuts against the portion of the inner peripheral wall 311 of the patrone chamber 310 connected to the film guides 317 of the camera 30. The abutment 217 of the adaptor 20 is engaged in the recess 190 of the small diameter patrone 10, so that the film outlet 215 of the adaptor 20 is oriented towards end 317A of the film guide 317 adjacent to the patrone chamber 310. Note that the abutment 217 is provided on the lower end 260 of the adaptor 20 so as not to interfere with the insertion of the small diameter patrone 10 in the adaptor 20.

According to the second embodiment, the film outlet 170 of the small diameter patrone 10 is oriented towards end 317A of the film guide 317 similar to the first embodiment. Consequently, the film portion 11, withdrawn from the film outlet 170, is moved to the film guide 317 without winding or bending. Thus, the film is maintained flat during the feeding operation thereof. Accordingly, neither an increase of the winding or rewinding force, nor damage of the film surface, occurs.

The positioning mechanism of the small diameter patrone 10, with respect to the adaptor 20, is not limited to that which is illustrated in the drawings corresponding to the first and second embodiments. For instance, it is possible to press the outer peripheral portion 110 of the film outlet 170 of the small diameter patrone 10 against the inner surface portion 211 of the end projection 210B of the adaptor 20, so that the light intercepting member 255 prevents the small diameter patrone 10 from slipping relative to the adaptor 20 in the circumferential direction.

Similarly, the above discussion can be applied to the positioning mechanism of the adaptor 20 with respect to the patrone chamber 310 of the camera 30. Namely, it is possible to provide an engaging portion on the outer surface 230 of the adaptor 20, so that the engaging portion can be engaged by the patrone chamber 310 or the surrounding recess or projection.

As can be seen from the above discussion, similar to the first embodiment, according to the second embodiment of the present invention, when the film 11 of the small diameter patrone 10, which is fitted in the adaptor 20 incorporated in the patrone chamber 310 of the camera 30, is wound or rewound from or into the small diameter patrone 10 by the winding spool or rewinding spool (not shown), the edge portions 12 of the film 11, outside the picture plane area 11B, come into sliding contact with the guide rails 213A or the guide rails 213A and 213B during the passage of the film through the film outlet 215 of the adaptor 20 and the film guides 317 of the camera 30. Consequently, the the picture plane area 11B, of the film plane 11A of the film 11, does not contact the inner surfaces 211A and 211B of the end projections 210A and 210B that define the film outlet 215. Accordingly, the picture plane area 11B can be prevented from being damaged during the passage of the film through the film outlet 215.

The sectional shape of the guide rails 213A and 213B is not limited to a trapezoid in the first and second embodiments. For example, the sectional shape of the guide rails 213A and 213B can be semi-circular.

The positions of the guide rails 213A and 213B on the inner surfaces 211A and 211B of the film outlet 215 are not limited to the illustrated embodiments. Namely, the guide rails 213A and 213B can be located at any position other than the picture plane area 11B of the film 11. For example, the guide rails 213A and 213B can be located to correspond to the perforations 11C or outside the perforations, etc.

Although the hinge portion 290 is formed by the thinner portion of the adaptor 20, that is in turn formed by the grooves 235 provided on the outer peripheral surface 230 of the adaptor 20 in the illustrated embodiment, the invention is not limited thereto. For instance, the hinge portion 290 can be formed by a tapered thinner portion 291 and a hinge piece 293 which is defined by a pair of circumferential parallel slits formed in the thinner portion 291.

Furthermore, the recess 261, provided in the lower portion 260 of the patrone receiving portion 220, can be dispensed with.

As can be understood from the foregoing, according to the present invention, a slip preventing means is provided on the inner surface of the adaptor opposed to the outer surface of the small diameter patrone which is fitted in the adaptor, and/or on the outer surface of the adaptor opposed to the inner wall surface of the patrone chamber in which the adaptor is received to prevent movement between the adaptor and the outer surface of the small diameter patrone and/or the inner wall surface of the patrone chamber.

Consequently, when the adaptor, in which the small diameter patrone is received, is inserted in the patrone chamber of the camera, neither an accidental detachment of the adaptor from the patrone chamber, nor an accidental detachment of the small diameter patrone from the adaptor takes place.

Furthermore, according to the present invention, a hole is provided in the portion of the adaptor that is located between the information indicating window of the back cover of the camera and the film information indicating portion provided on the small diameter patrone, when the patrone chamber is closed by the back cover of the camera.

Consequently, the information of the indicating portion of the small diameter patrone received in the patrone chamber of the camera can be viewed from the outside of the camera through the information indicating window formed in the back cover of the camera.

Moreover, since the light intercepting member is provided on the portion of the adaptor that is opposed to the outer surface of the small diameter patrone in the vicinity of the through hole, and comes into contact with the outer surface of the small diameter patrone, light, which would otherwise be made incident upon the adaptor through the information indicating window from the outside of the camera, is intercepted so as not to expose the film portion withdrawn from the small diameter patrone.

Furthermore, according to the present invention, the adaptor holds the small diameter patrone such that the film outlet of the small diameter patrone is oriented towards the end of the film guides of the camera connected to the patrone chamber, adjacent to the patrone chamber, when the adaptor, in which the small diameter patrone is charged or received is inserted in the patrone chamber of the camera.

Consequently, if the small diameter patrone is loaded in the patrone chamber for the JIS 135 type patrone, with the help of the adaptor, the film which is fed from the patrone is maintained relatively straight. This decreases the force necessary to wind or rewind the film and further prevents the film plane from being damaged.

Furthermore, according to the present invention, since the guide rails are provided at the film outlet through which the film is withdrawn from the small diameter patrone to come into contact with the opposite edge portions of the film other than the picture plane area thereof, the picture plane area of the film does not contact the adaptor, thus preventing damage of the picture plane area.

The patrone chamber 310 is provided on the inner wall surface 311 thereof with a threaded hole 307 corresponding to the screw insertion hole 222 of the adaptor 20.

To immovably attach the adaptor 20 to the patrone chamber 310, the patrone receiving portion 220 is fitted in the patrone chamber 310 of the camera 30 such that the recess 261 of the patrone receiving portion 220 concurs with the rewinding fork 315 of the patrone chamber 310. Thereafter, the set screw 40 is inserted in the screw insertion hole of the adaptor 20 and screwed in the threaded hole 317 of the patrone chamber 310 from the side of the inner surface 250 of the adaptor 20. Consequently, the adaptor 20 is fitted and secured in the patrone chamber 310. Thus, the adaptor is not detached from the patrone chamber when the small diameter patrone 10 is inserted in and discharged from the adaptor 20.

Figure 6:
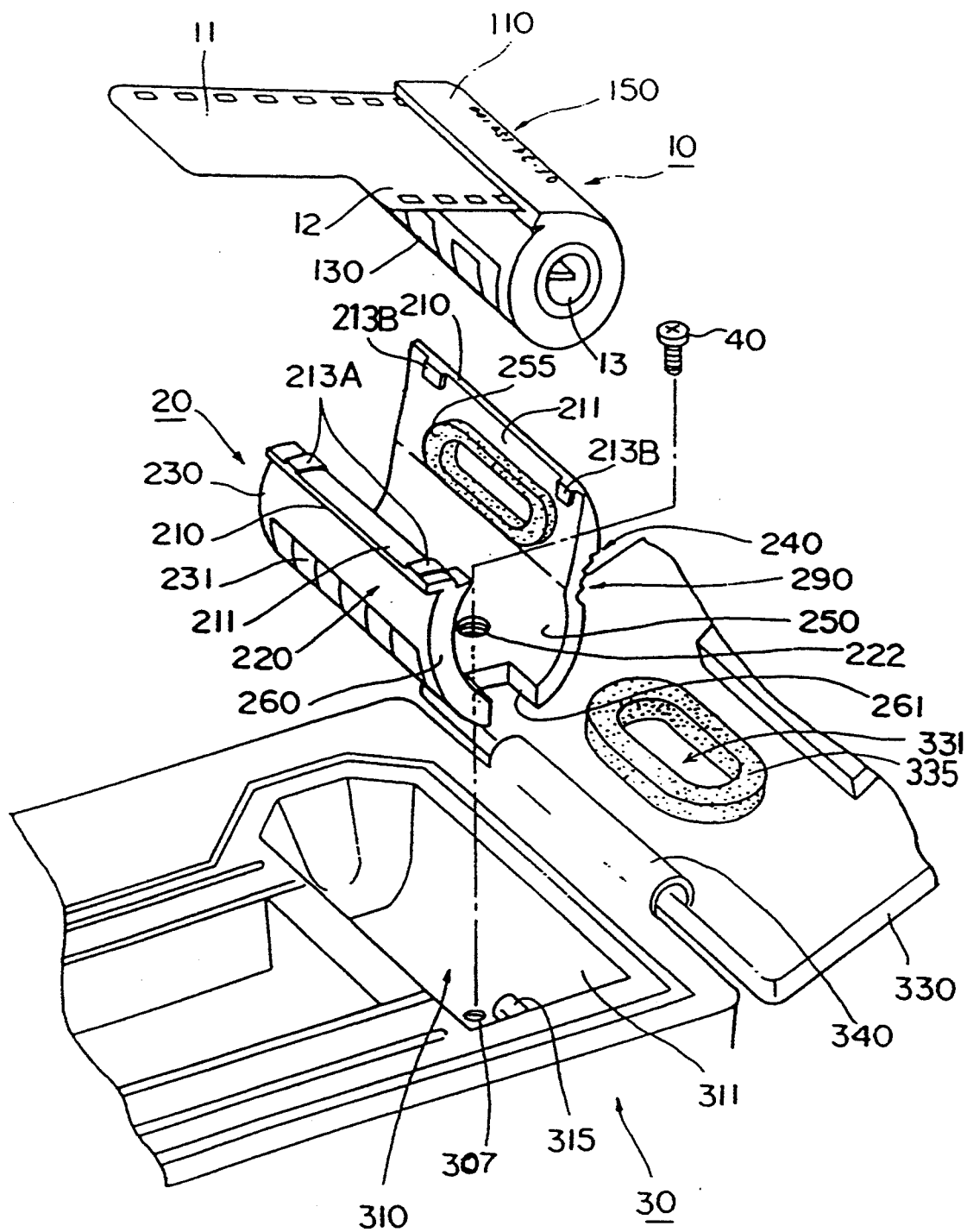
FIG. 6 is a perspective view of an adaptor in which a small diameter patrone is to be fitted, and a patrone chamber of a camera in which the adaptor is to be inserted, according to a third embodiment of the present invention.
Figure 7:
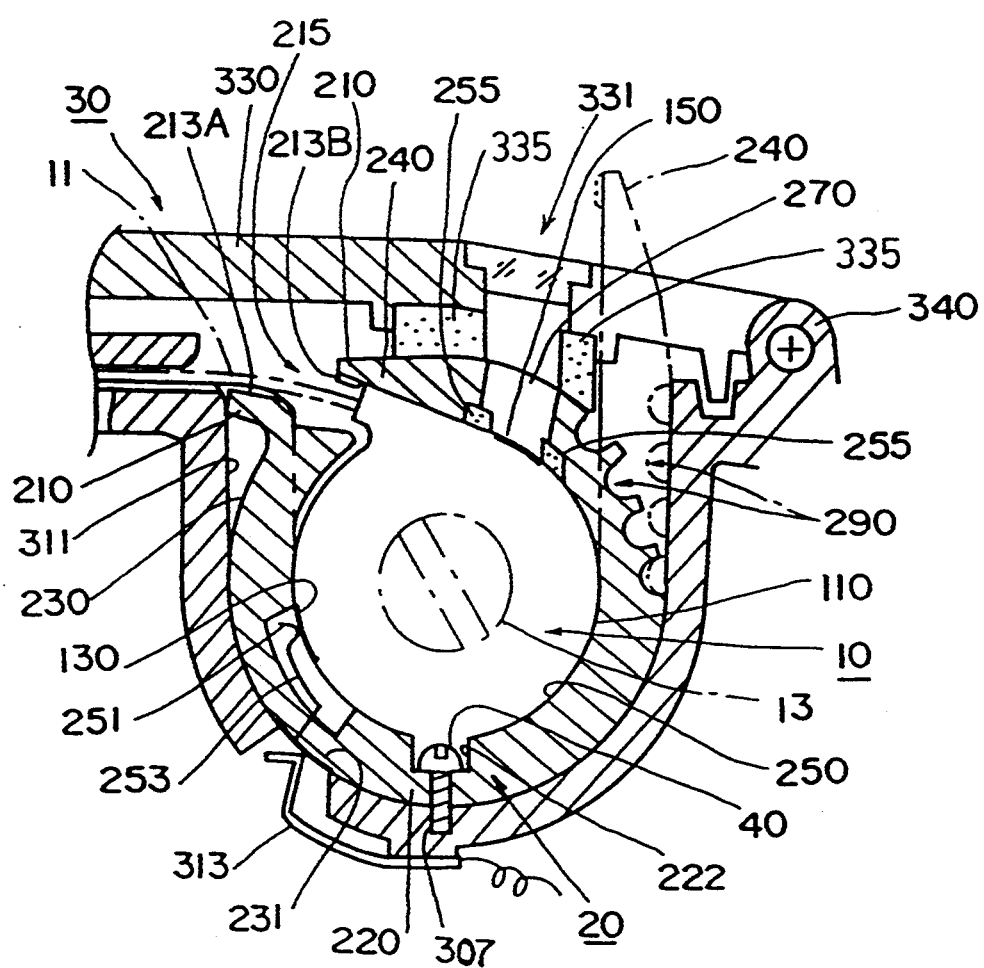
FIG. 7 is an enlarged sectional view of an adaptor accommodated in a patrone chamber of a camera shown in FIG. 6.

As can be seen from the above discussion, according to the embodiment illustrated in FIGS. 6 and 7, since the patrone chamber 310 is provided with the threaded hole 307 corresponding to the screw insertion hole 222 of the adaptor 20, the adaptor 20 can be secured to the patrone chamber 310 by the set screw 40 when the adaptor 20 is fitted in the patrone chamber 310.

Figure 8:
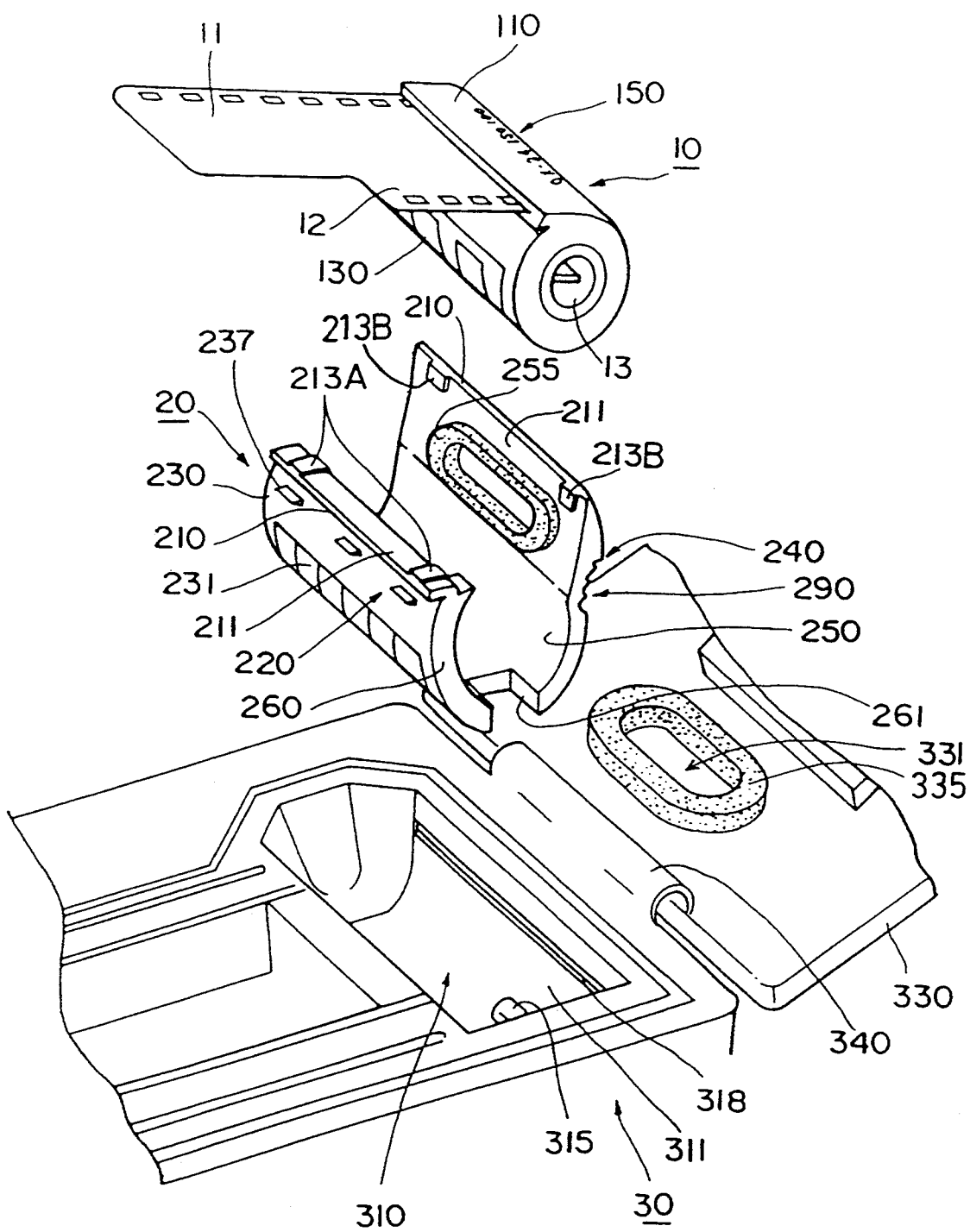
FIG. 8 is a perspective view of an adaptor in which a small diameter patrone is to be fitted and a patrone chamber of a camera in which the adaptor is to be inserted, according to a fourth embodiment of the present invention.
Figure 9:
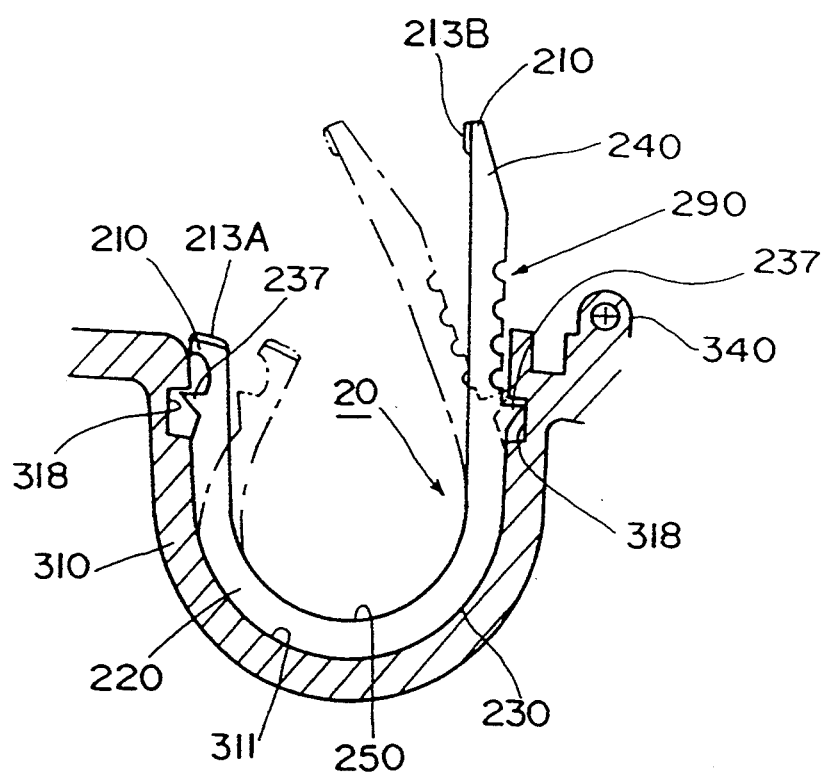
FIG. 9 is an enlarged sectional view of an adaptor accommodated in a patrone chamber of a camera shown in FIG. 8.

FIGS. 8 and 9 show a fourth embodiment of the present invention. In FIGS. 8 and 9, the elements corresponding to those in FIGS. 6 and 7 are designated with like reference numerals and no detailed explanation thereof will be given herein.

The patrone chamber 310 is provided on the inner wall surface 311 thereof with engaging grooves 318, which constitute a second engaging member, in which corresponding engaging projections 237 can be engaged. Engaging projections 237 constitute a first engaging member provided on the outer wall surface 230 of the patrone receiving portion 220 of the adaptor 20. The engaging projections 237 are spaced from one another in the longitudinal direction of the adaptor 20.

Consequently, when the patrone receiving portion 220 of the adaptor 20 is inserted in the patrone chamber 310 of the camera 30, the engaging projections 237 of the adaptor 20 are engaged in the engaging grooves 318 of the patrone chamber 310, so that even if an external force is exerted on the adaptor 20 to pull the adaptor 20 out of the patrone chamber 310, detachment of the adaptor 20, from the patrone chamber 310, would not take place. However, the adaptor 20 can be pulled out of the patrone chamber 310 when a relatively large external force, above a predetermined value, is applied thereto.

Thus, also in the fourth embodiment, the adaptor 20 can be immovably fitted and held in the patrone chamber 310 similar to the third embodiment shown in FIGS. 6 and 7.

The spaced engaging projections 237 can be replaced with a single projection extending in the longitudinal direction of the adaptor 20 on each side of the patrone receiving portion 220 thereof.

Figure 10:
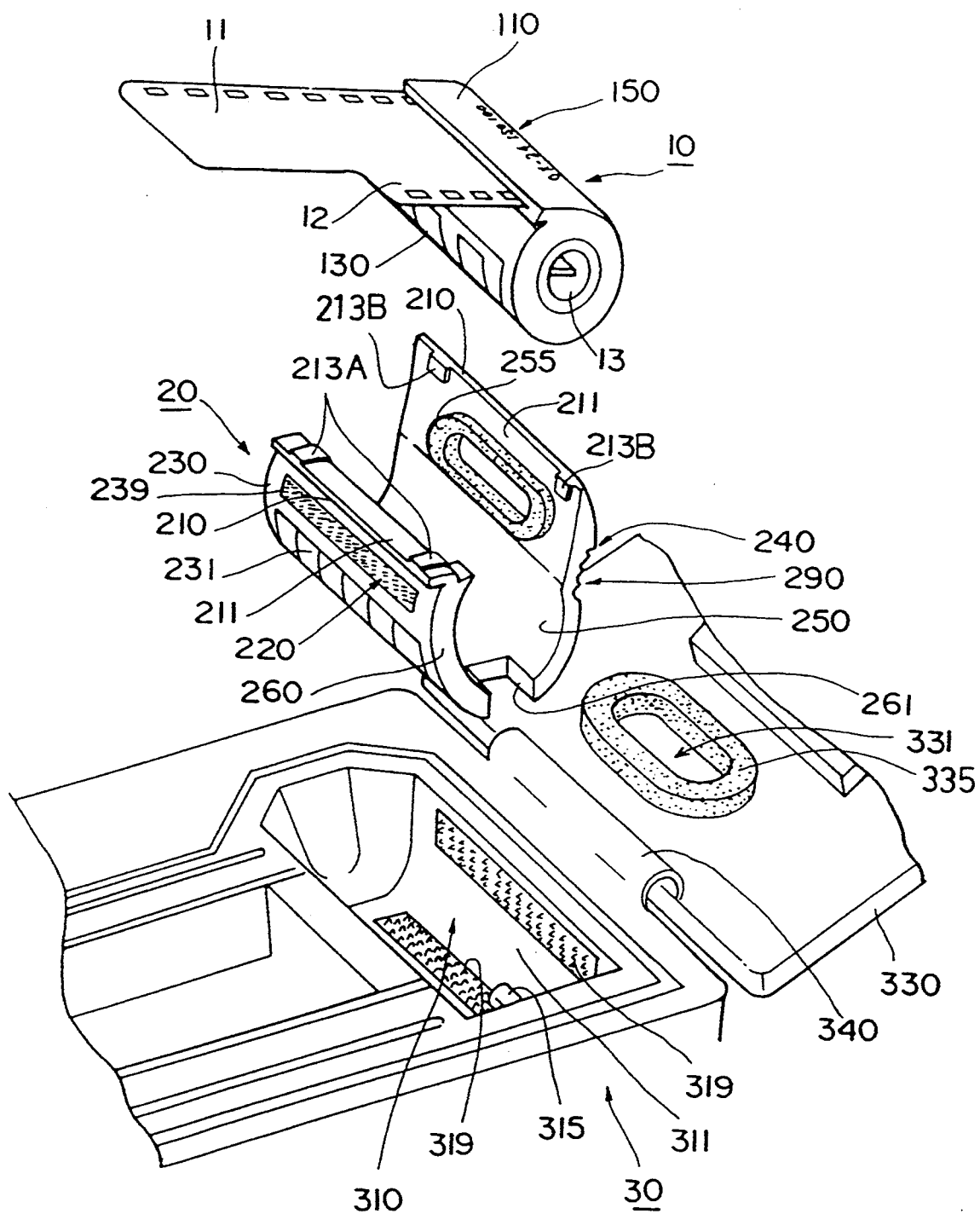
FIG. 10 is a perspective view of an adaptor in which a small diameter patrone is to be fitted and a patrone chamber of a camera in which the adaptor is to be inserted, according to a fifth embodiment of the present invention.
Figure 11:
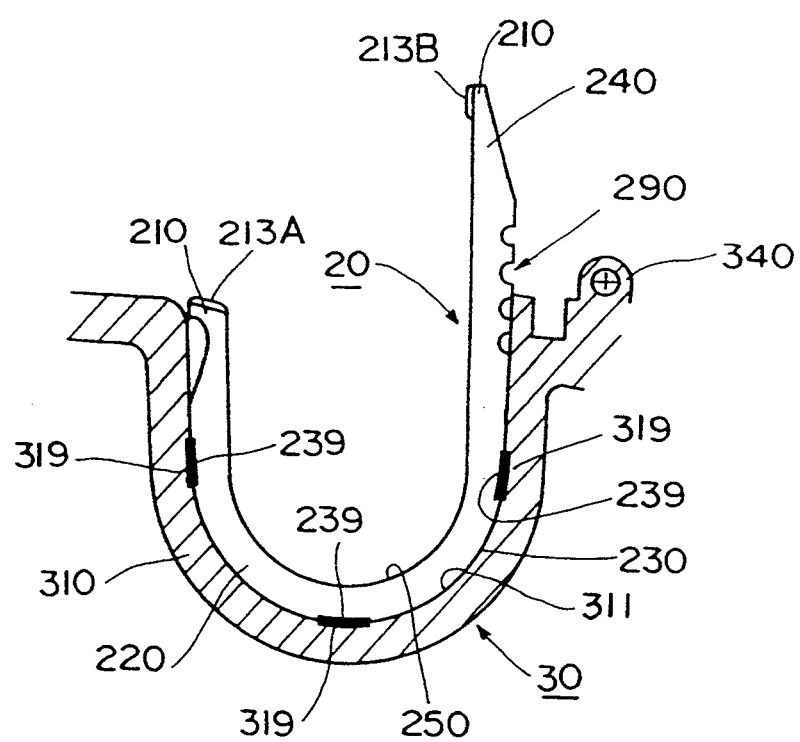
FIG. 11 is an enlarged sectional view of an adaptor accommodated in a patrone chamber of a camera shown in FIG. 10.

FIGS. 10 and 11 show a fifth embodiment of the present invention. In FIGS. 10 and 11, the elements corresponding to those in FIGS. 6 and 7 or FIGS. 8 and 9 are designated with like reference numerals and no detailed explanation thereof will be given herein.

The patrone chamber 310 is provided on the inner wall surface 311 thereof with planar fasteners such as a VELCRO-type hook and loop fastener (or adhesive tape) 319 adhered thereto which constitute a second engaging member with which corresponding planar fasteners such as a VELCRO-type hook and loop fastener (or adhesive tape) 239 (which constitute a first engaging member) adhered to the outer wall surface 230 of the patrone receiving portion 220 of the adaptor 20 can engage.

Consequently, when the patrone receiving portion 220 of the adaptor 20 is inserted in the patrone chamber 310 of the camera 30, the planar fasteners 239 of the adaptor 20 are engaged by or adhered to the corresponding planar fasteners 319 of the patrone chamber 310, so that even if an external force is exerted on the adaptor 20 to pull the adaptor 20 out of the patrone chamber 310, accidental detachment of the adaptor 20 from the patrone chamber 310 would not take place. The adaptor 20 can be detached from the patrone chamber 310 when a relatively large external force, above a predetermined value, is applied thereto.

Thus, also in the fifth embodiment, the adaptor 20 can be immovably fitted and held in the patrone chamber 310, similar to the third and fourth embodiments shown in FIGS. 6 and 7, and FIGS. 8 and 9, respectively.

The securing device of the adaptor and the patrone chamber is not limited to those in the illustrated embodiments. For example, it is possible to use the securing device (i.e., projections and grooves) shown in FIGS. 6 and 7 and the securing device (i.e., adhesive tapes or fasteners) in combination.

As can be understood from the foregoing, since the securing device is provided in the patrone chamber of the camera, the adaptor can be immovably and permanently held in the patrone chamber.

Figure 12:
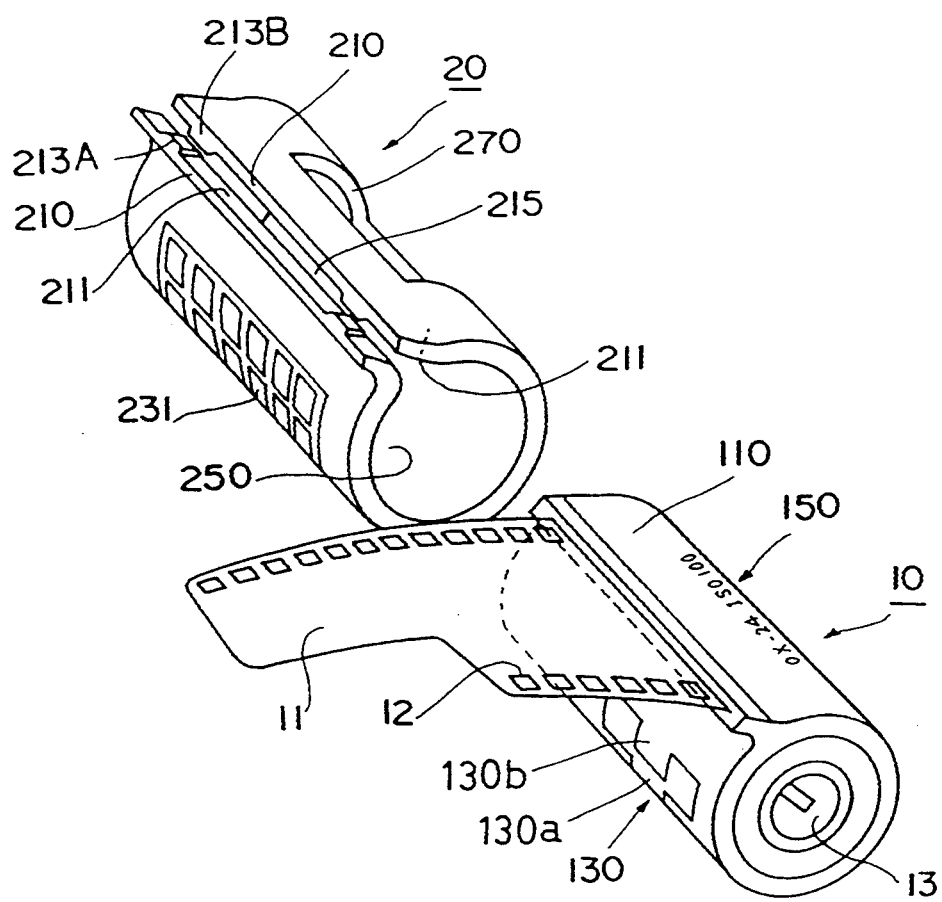
FIG. 12 is a perspective view of a small diameter patrone and an adaptor therefor, according to a sixth embodiment of the present invention.

FIG. 12 is a perspective view of a small diameter patrone and an adaptor therefor, according to a sixth embodiment of the present invention.

In FIG. 12, the components, corresponding to those shown in FIGS. 1 through 11, are designated with like reference numerals and no detailed explanation will be given herein.

The small diameter patrone 10 has an outer diameter smaller than that of the JIS 135 type patrone (not shown), but the diameter of the winding shaft 13 of the small diameter patrone 10 is identical to that of the JIS 135 type patrone.

The small diameter patrone 10 is provided on the outer peripheral surface 110 with a film information contact portion 130 having a predetermined pattern of conductor portions 130a and insulating portions 130b, and an indicating portion 150 in which letters representing the film speed or the number of frames, etc., of the film loaded in the small diameter patrone 10 are printed.

The film information contact portion 130 is divided into 12 sections (2 by 6). The conductor portions 130a are formed on two sections used as grounding conductors and some of the 10 remaining sections. The insulating portions 130b are formed on the remaining sections.

A predetermined pattern of conductor 130a of the film information contact portion 130 represents the film information of the film loaded in the small diameter patrone 10, such as film-speed.

Figure 14:
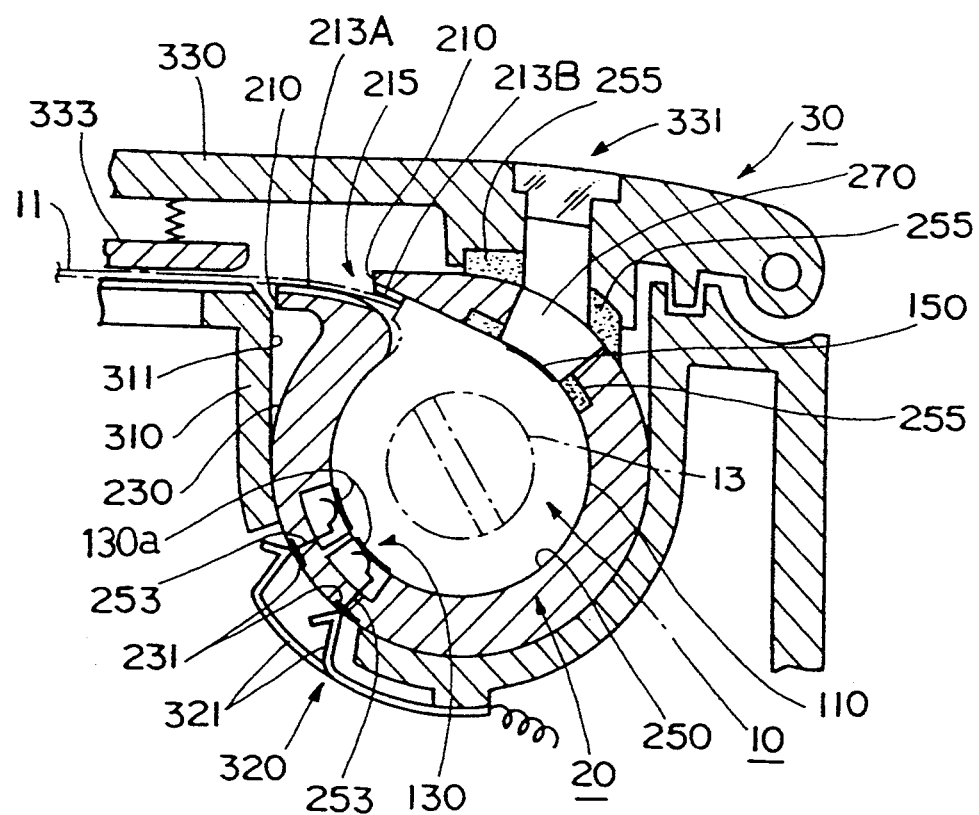
FIG. 14 is an enlarged sectional view of an adaptor as shown in FIG. 12, having a small diameter patrone received therein, fitted in a patrone chamber of a camera designed for a JIS 135 type patrone.

FIG. 14 is an enlarged sectional view of a patrone chamber of a camera designed for the JIS 135 type patrone (not shown), in which the adaptor 10, having the small diameter patrone 10 received therein, is fitted.

As can be seen in FIG. 14, the patrone chamber 310 of the camera 30 is generally of U-shape in section, and is provided on the inner wall surface 311 thereof with terminals 321 which can be connected to the film information contact portion provided on the outer peripheral surface of the JIS 135 type patrone (not shown). In the illustrated embodiment, there are 12 terminals 321 in the patrone chamber 310 of the camera 30 to constitute the film information terminal portion 320.

The adaptor 20 is provided on the outer peripheral surface 230 with 12 (2 by 6) connecting contacts 231 which can be connected to the terminals 321 of the film information terminal portion 320 of the camera 30.

Figure 13:
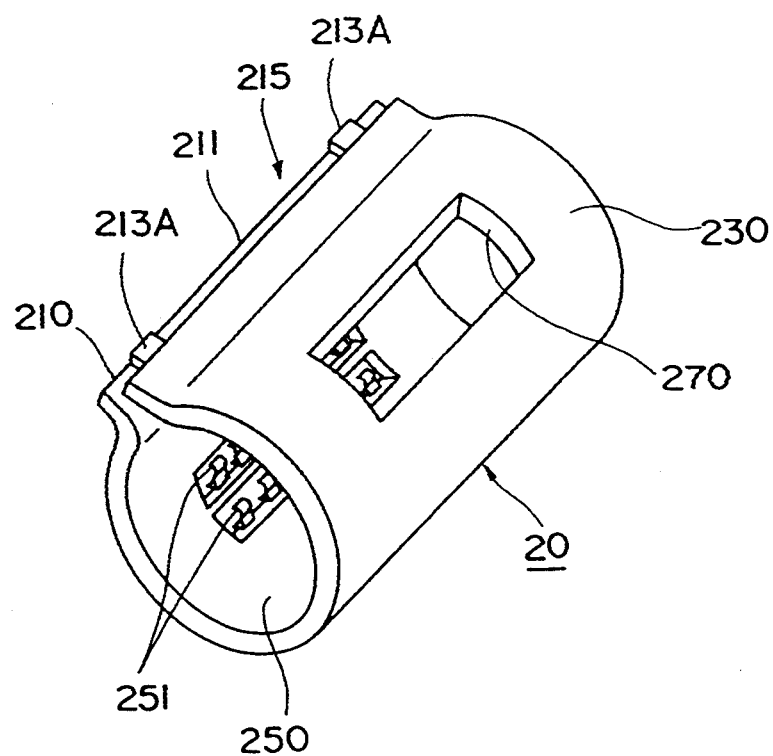
FIG. 13 is a perspective view of an adaptor for small diameter patrone shown in FIG. 12.

The adaptor 20 is provided on the inner peripheral surface 250 with 12 (2 by 6) connecting terminals 251 which correspond to the 12 sections of the film information contact portion 130 and which can be selectively connected to the conductor portions 130a or the insulating portions 130b of the film information contact portion 130 of the small diameter patrone 10, as can be seen in FIG. 13.

The connecting terminals 251 and the connecting contacts 231 corresponding thereto are electrically interconnected by lead portions 253, as shown in FIG. 14. The connecting terminals 251, the connecting contacts 231, and the lead portions 253 constitute a connecting means in the present invention.

When the small diameter patrone 10 is inserted in the adaptor 20 of the sixth embodiment, the space between opposite ends 210 of the adaptor 20 is slightly expanded to increase the inner diameter of the adaptor 20, so that the outer peripheral surface 110 of the small diameter patrone 10 can be fitted in the inner wall surface of the adaptor 20. Thereafter, the adaptor 20, having the small diameter patrone 10 received therein, is fitted in the patrone chamber 310 of the camera 30.

As can be seen in FIG. 14, the connecting terminals 251 of the adaptor 20 are connected to the conductor portions 130a or the insulating portions 130b of the film information contact portion 130 of the small diameter patrone 10, so that the connecting contacts 231 of the adaptor 20 are connected to the 12 terminals 321 of the film information contact portion 320 of the camera 30.

As a result, the terminals 321, connected to the conductor portions 130a of the film information contact portion 130 are connected through the contacts 231, the lead portions 253 and the terminals 251 to the camera 30, so that the information, such as the film-speed of the small diameter patrone 10, received in the patrone chamber, can be detected in accordance with the conductor pattern.

As can be understood from the above discussion, according to the sixth embodiment, when the small diameter patrone 10 is loaded in the patrone chamber 310 of the camera 30, using the adaptor 20, the terminals 321 of the film information terminal portion 320 of the camera 30 are electrically connected to the conductor portions 130a of the film information contact portion 130 of the small diameter patrone 10 through the connecting contacts 231 of the adaptor 20 and the lead portions 253 and the connecting terminals 251.

Thus, film information, such as film-speed of the small diameter patrone 10, represented by the conductor pattern of the film information contact portion 130, can be automatically detected on the camera body side.

Figure 15:
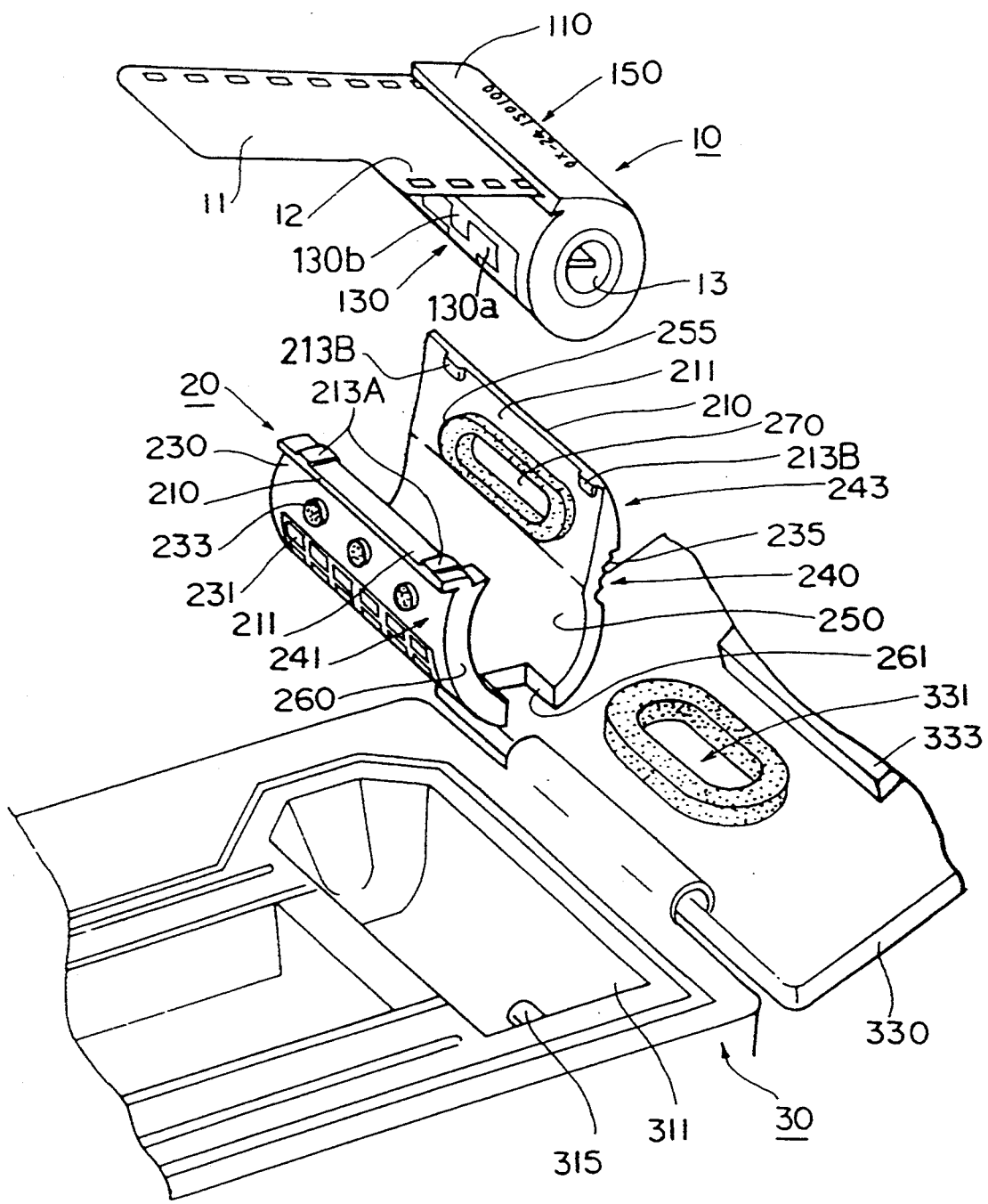
FIG. 15 is a perspective view of a patrone chamber of a camera designed for a JIS 135 type patrone, a small diameter patrone, and an adaptor in which the small diameter patrone can be received, according to a seventh embodiment of the present invention.
Figure 16:
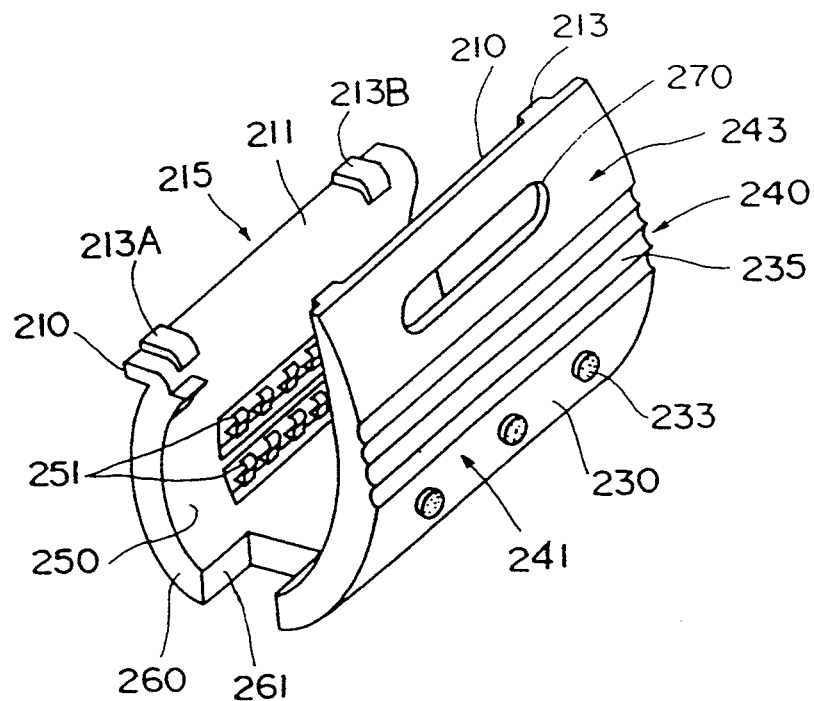
FIG. 16 is a perspective view of an adaptor for small diameter patrone, shown in FIG. 15.
Figure 17:
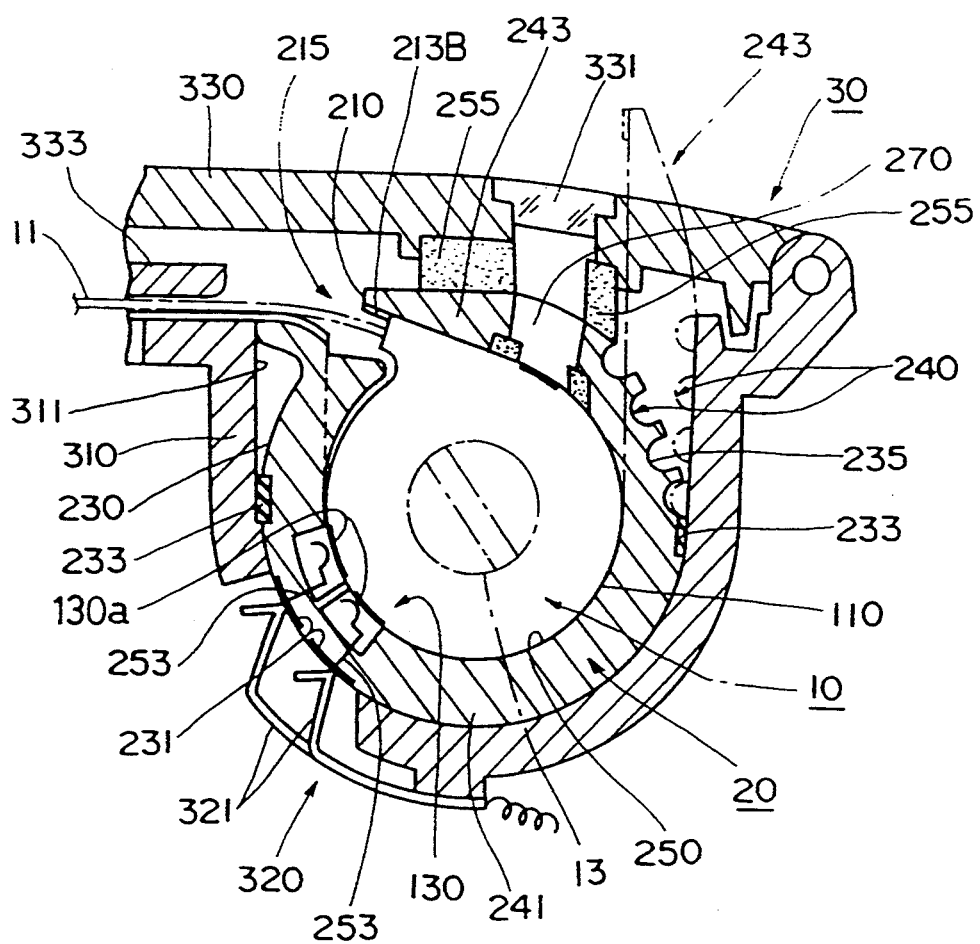
FIG. 17 is an enlarged sectional view of an adaptor of FIG. 15 having a small diameter patrone received therein, fitted in a patrone chamber of a camera designed for the JIS 135 type patrone.

FIGS. 15, 16 and 17 show a seventh embodiment of the present invention. FIG. 15 is a perspective view of an adaptor and a patrone chamber of a camera designed for the JIS 135 type patrone, according to a seventh embodiment of the present invention. FIG. 16 is a perspective view of an adaptor shown in FIG. 15, as viewed from another direction. FIG. 17 is an enlarged view of a patrone chamber in which the adaptor, having the small diameter patrone received therein, is fitted.

In FIGS. 15 through 17, the components corresponding to those shown in FIGS. 1 through 14 are designated with like reference numerals and no detailed explanation will be given herein.

When the patrone receiving portion 241 of the adaptor 20 is inserted and fitted in the patrone chamber 310 of the camera 30, the recess 261 of the patrone receiving portion 241 is registered with the rewinding fork 315 of the patrone chamber 310. Thereafter, the lid portion 243 of the adaptor 20 is opened, as shown at an imaginary line in FIG. 17, so that the small diameter patrone 10 can be inserted and fitted in the patrone receiving portion 241 of the adaptor 20. When the small diameter patrone 10 is received in the patrone receiving portion 241 of the adaptor 20, the lid portion 243 is closed, as shown by a solid line in FIG. 17.

Consequently, the connecting terminals 251 (FIGS. 16 and 17) of the adaptor 20 are connected to the conductor portions 130a or the insulating portions 130b of the film information contact portion 130 of the small diameter patrone 10, so that the connecting contacts 231 of the adaptor 20 are connected to the 12 terminals 321 of the film information contact portion 320 of the camera 30, similar to the sixth embodiment.

As a result, the terminals 321 of the film information terminal portion 320 are connected to the conductor portions 130a of the film information contact portion 130 of the small diameter patrone 10 through the contacts 231 of the adaptor 20, the lead portions 253 and the terminals 251. Thus, information, such as the film-speed of the small diameter patrone 10, can be automatically detected in accordance with the conductor pattern.

Figure 18:
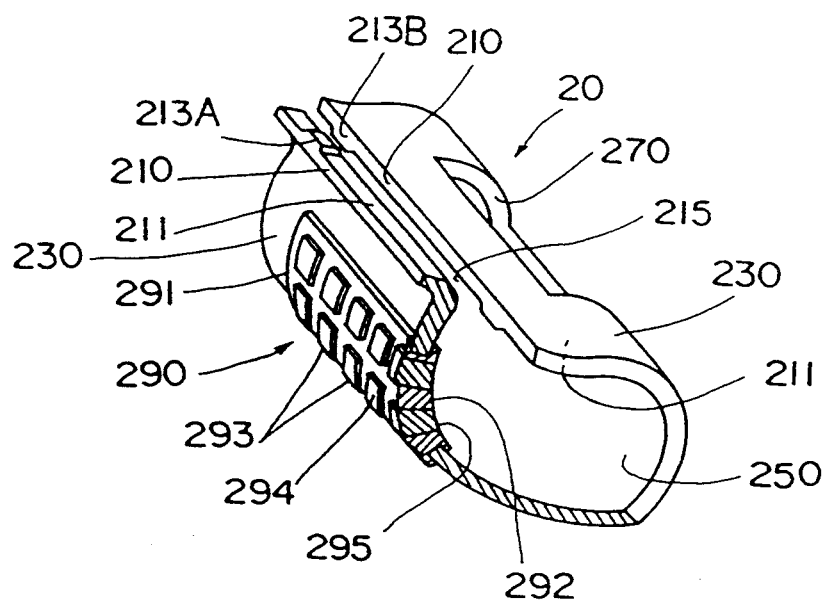
FIG. 18 is a partially broken perspective view of an adaptor for small diameter patrone, according to an eighth embodiment of the present invention.

Unlike the sixth and seventh embodiments in which the contacts 231, the terminals 251 and the lead portions 253 constitute the connecting means, it is possible for the connecting means to be constituted by a connector member 290 which is made of an insulation material and which has a surface 291 that can be brought into contact with the film information terminal portion 320 of the camera 30 and a surface 292 that can be brought into contact with the film information contact portion 130 of the small diameter patrone 10, respectively, as shown in FIG. 18. FIG. 18 is a partially broken perspective view of an eighth embodiment of the present invention.

As can be seen in FIG. 18, the connector member 290 is provided with 12 conductors 293 extending through the adaptor 20. One end 294 of each conductor 293 opens into the surface 291 of the connector member 290, so that the conductors 293 can be connected at the ends 294 to the terminals 321 of the film information terminal portion 320 of the camera 30.

The other ends 295, of the conductors 293, open into the surface 292 of the connector member 290 and are located to correspond to the 12 sections of the film information contact portion 130, so that the conductors 293 can be connected at the ends 295 to the conductor portions 130a or insulating portions 130b of the film information contact portion 130 of the small diameter patrone 10.

In the eighth embodiment, when the small diameter patrone 10 is loaded in the camera, the small diameter patrone 10 is fitted in the inner wall surface of the adaptor 20. The adaptor 20 having the small diameter patrone 10 received therein is fitted in the patrone chamber 310 of the camera 30, similar to the sixth embodiment discussed above.

Consequently, the ends 295 of the 12 conductors 293 of the connector member 290 are connected to the conductor portions 130a or the insulating portions 130b of the film information contact portion 130 of the small diameter patrone 10. The ends 294 of the conductors 293 are connected to the 12 terminals of the film information terminal portion 320 of the camera 30.

As a result, the terminals 321, connected to the conductor portions 130a of the film information contact portion 130, are connected through the conductors 293 in the camera 30, so that information, such as the film-speed of the small diameter patrone 10 received in the patrone chamber, can be detected in accordance with the conductor pattern.

As can be understood from the above discussion, according to the eighth embodiment, when the small diameter patrone 10 is loaded in the patrone chamber 310 of the camera 30, using the adaptor 20, the terminals 321 of the film information terminal portion 320 of the camera 30 are electrically connected to the conductor portions 130a of the film information contact portion 130 of the small diameter patrone 10 through the 12 conductors 293 of the connector member 290, similar to the sixth embodiment.

Thus, film information, such as film-speed of the small diameter patrone 10 represented by the conductor pattern of the film information contact portion 130 can be automatically detected on the camera body side.

Furthermore, according to the eighth embodiment, the connecting device which is constituted by the single connector member 290, can be simplified in comparison with the adaptor of the sixth and seventh embodiments in which the connecting means is constituted by 12 pairs of the connecting contacts 231, the lead portions 253 and the connecting terminals 251.

Figure 19:
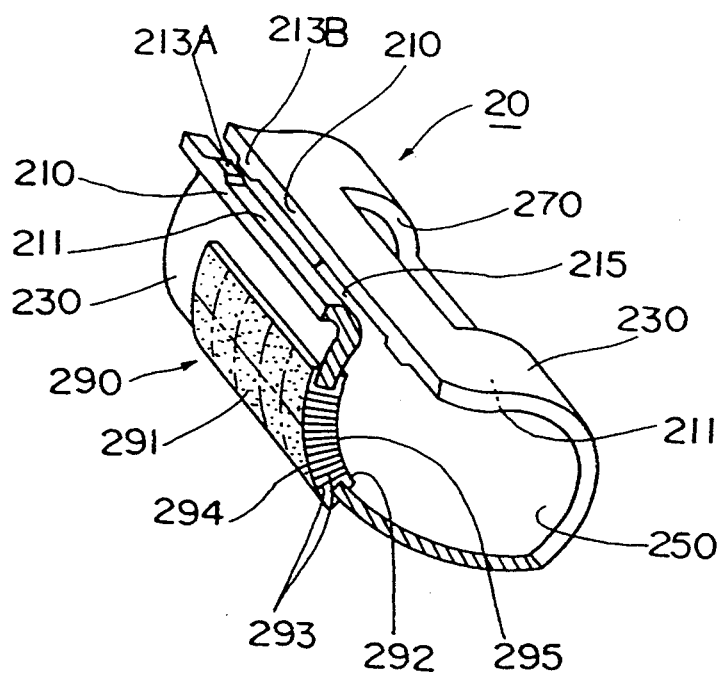
FIG. 19 is a partially broken perspective view of a modification of an adaptor shown in FIG. 18.

Note that in FIG. 18, the 12 conductors 293 provided in the connector member 290 to correspond to the 12 sections of the film information contact portion 130 can be replaced with an unlimited number of conductors 293, arranged in a predetermined pattern in a flexible insulator, each opening at opposite ends thereof into the surface 291 and 292, respectively, as shown in FIG. 19.

In this replacement shown in FIG. 19, each conductor 293 does not simultaneously contact more than one section of the film information contact portion 130 of the small diameter patrone 10. Accordingly, the conductor pattern defined by the conductors 293 is substantially identical to the conductor pattern defined by the conductor portions 130a and the insulating portions 130b of the film information contact portion 130 of the small diameter patrone 10.

In the sixth through eighth embodiments, the film information contact portion 130 of the small diameter patrone 10 is divided into 12 (2 by 6) sections similar to the film information contact portion of the JIS 135 type patrone, as mentioned above. In a ninth embodiment which will be discussed below, the pattern of the film information contact portion 130 of the small diameter patrone 10 is different from that of the JIS 135 type patrone.

Figure 20:
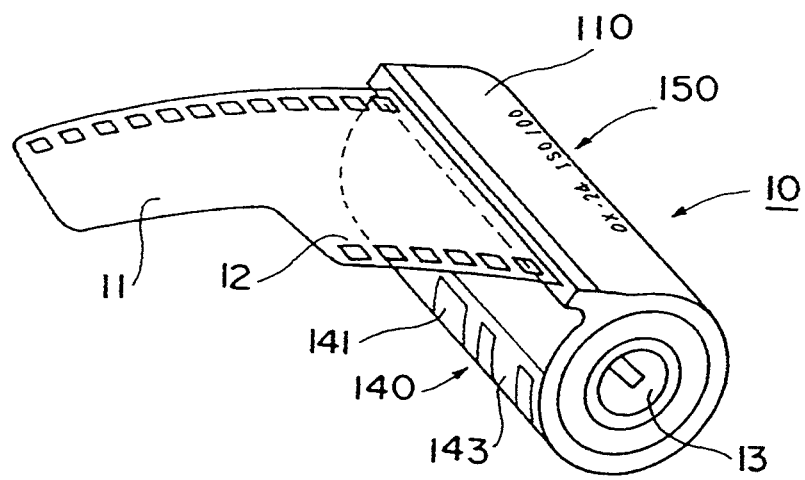
FIG. 20 is a perspective view of a small diameter patrone having a film information contact portion different from that of a JIS 135 type patrone.
Figure 21:
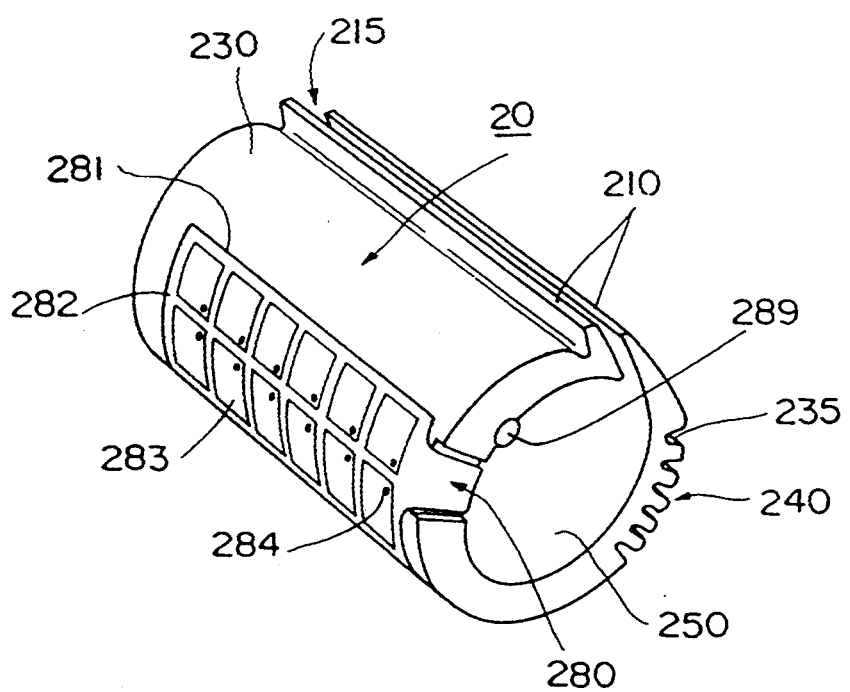
FIG. 21 is a perspective view of an adaptor which is to be used with a small diameter patrone, as shown in FIG. 20, according to a ninth embodiment of the present invention; and, FIG. 22 is a partially broken perspective view of an adaptor for a small diameter patrone shown in FIG. 21.
Figure 22:
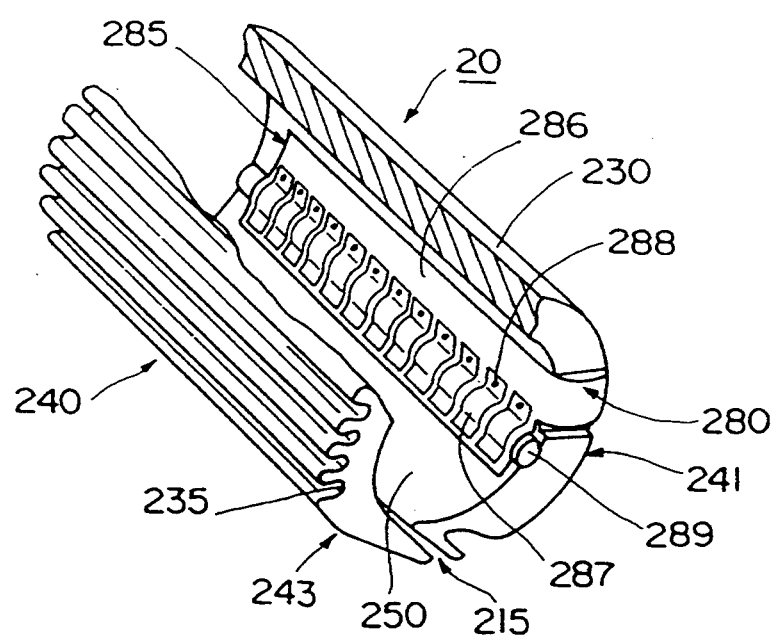

FIG. 20 is a perspective view of a small diameter patrone which is provided with the film information contact portion having a pattern different from that of the JIS 135 type patrone. FIGS. 21 and 22 are perspective views of an adaptor according to a ninth embodiment of the present invention, shown in closed and open positions, respectively.

In FIGS. 20, 21 and 22, components corresponding to those in FIG. 12 are designated with like reference numerals and no detailed explanation therefor is given herein.

The small diameter patrone 10 is provided on the outer peripheral surface 110 thereof with a film information contact portion 140 having a predetermined pattern of conductor portions 141 and insulating portions 143. The film information contact portion 140 is divided into 12 sections (1 by 12). The conductor portions 141 are provided on two sections used as grounding conductors and some of the 10 remaining sections.

The insulating portions 143 are formed on the remaining sections.

Film information, such as a film-speed of the film received in the small diameter patrone 10 is represented by a conductor pattern of the film information contact portion 140.

In the ninth embodiment corresponding to the small diameter patrone 10, as shown in FIG. 20, the adaptor 20 is provided with a flexible circuit sheet 280 which extends from the outer peripheral surface 230 thereof to the inner peripheral surface 250, as shown in FIGS. 21 and 22. The flexible sheet (i.e., double flexible circuit sheet) 280 is provided on opposite surfaces thereof with printed circuits.

The flexible sheet 280 has a first sheet portion 281 which is located on the outer surface 230 of the adaptor 20, and which has a surface 282 on which 12 (2 by 6) conductor portions 283 that can be brought into contact with the 12 terminals 321 of the film information contact portion 320 of the camera 30 are formed, as can be seen in FIG. 21.

The flexible sheet 280 also has a second sheet portion 285 which is located on the inner surface 250 of the adaptor 20 and which has a surface 286 on which 12 (1 by 12) conductor portions 287 corresponding to the 12 sections of the film information contact portion 140 are formed so as to selectively come into contact with the conductor portions 141 or insulating portions 143 of the film information contact portion 140 of the small diameter patrone 10, as shown in FIG. 22.

Furthermore, an elastic insulation member 289 made of rubber or the like is inserted between the rear surface of the second sheet portion 285 and the inner peripheral surface 250 of the adaptor 20 to bring the conductor portions 287 of the second sheet portion 285 into contact with the film information contact portion 140 of the small diameter patrone 10 fitted in the adaptor 20, as shown in FIG. 21.

A predetermined pattern of conductor circuit (not shown) is formed on the rear surfaces of the first and second sheet portions 281 and 285 to electrically connect the conductor portions 283 of the first sheet portion 281 and the corresponding conductor portions 287 of the second sheet portion 285.

The flexible circuit sheet 280 is provided, on the first and second sheet portions 281 and 285, with holes 284 and 288 which extend through the flexible circuit sheet 280 from the front surface 282 and 286 to the rear surface thereof. Electrical conductors (not shown) are inserted in the holes 284 and 288, so that an electrical connection between the conductor pattern of the rear surfaces of the first and second sheet portions 281 and 285 and the conductor portions 283 and 287 can be established by the electrical conductors embedded in the holes 284 and 288.

In the ninth embodiment, the double flexible circuit sheet 280 constitutes a connecting means. The conductor portions 283 and 287 and the conductor pattern of the flexible circuit sheet are formed, for example, by an etching method per se known.

The patrone receiving portion 241 of the adaptor 20 is inserted and fitted in the patrone chamber 310 of the camera 30, similar to the seventh embodiment mentioned above. Thereafter, the small diameter patrone 10 is inserted and fitted in the patrone receiving portion 241 of the adaptor 20. When the small diameter patrone 10 is received in the patrone receiving portion 241 of the adaptor 20, the lid portion 243 is closed.

Consequently, the 12 conductor portions 287 of the second sheet portion 285 of the adaptor 20 are elastically brought into contact with the conductor portions 141 or the insulating portions 143 of the film information contact portion 140 of the small diameter patrone 10, as shown in FIG. 20, by the spring force of the elastic member 289. Similarly, the 12 conductor portions 283 of the first sheet portion 281 of the adaptor 20 are elastically connected to the 12 terminals 321 of the film information terminal portion 320 of the camera 30.

As a result, the terminals 321 of the film information terminal portion 320, which are connected to the conductor portions 131 formed on the grounding sections and other sections of the film information contact portion 130, are interconnected in the camera 30 through the conductor portions 283, the holes, the lead portions, and the conductor portions 287. Thus, information, such as the film-speed of the small diameter patrone 10 fitted in the adaptor can be automatically detected on the camera side in accordance with the conductor pattern.

As can be understood from the above discussion, according to the ninth embodiment, when the adaptor 20, in which the small diameter patrone 10 is loaded, is received in the patrone chamber 310 of the camera 30, the terminals 321 of the film information terminal portion 320 of the camera 30 are electrically connected to the conductor portions 141 of the film information contact portion 140 of the small diameter patrone 10 through the conductor portions 283 and 287 of the flexible circuit sheet 280, the lead portions and the holes.

Consequently, the information, such as the film-speed of the small diameter patrone 10 represented by the conductor pattern of the conductor portions 141 of the film information contact portion 140 can be automatically discriminated in the camera body.

According to the ninth embodiment, even if the conductor pattern of the film information contact portion of the small diameter patrone is different from that of the film information contact portion of the JIS 135 type patrone, the film information contact portion of the small diameter patrone can be electrically connected to the film information terminal portion of the camera.

Although the conductor portions 287, formed on the second sheet portion 285 of the flexible circuit sheet 280, are arranged in the pattern of 1 by 12 as mentioned above, the pattern of the conductor portions 287 is not limited thereto and can be determined in accordance with the conductor pattern of the film information contact portion of the small diameter patrone.

Although the connecting device is constituted by the double flexible circuit sheet 280 which is provided on both the front and back surfaces thereof with the circuits in the ninth embodiment, a flexible circuit sheet having a circuit formed on only one of the front and back surfaces thereof can be used.

Although there are 12 pairs of conductor portions for connecting the film information terminal portion 320 of the camera 30 and the film information contact portion 130 or 140 of the small diameter patrone in the sixth through ninth embodiments discussed above, the number of the conductor portions is not limited thereto. For example, if information other than the film-speed from the film information contact portion 130 or 140 is necessary, only 6 pairs of conductor portions can be used.

As can be seen from the foregoing, according to the present invention, the adaptor which is to be provided between the inner peripheral surface of the patrone chamber and the outer wall surface of the small diameter patrone is provided with the connecting means for electrically connecting the film information terminal portion provided on the inner wall surface of the patrone chamber and the film information contact portion provided on the outer wall surface of the small diameter patrone.

Consequently, when the small diameter patrone having lo thereon the film information contact portion similar to that of the JIS 135 type patrone is received in the patrone chamber using the adaptor according to the present invention, the film information contact portion of the small diameter patrone is electrically connected to the film information terminal portion of the patrone chamber, so that information including film-speed data can be automatically detected in the camera body.

Furthermore, according to the present invention, the film information terminal portion includes a plurality of terminals, and the film information contact portion includes a predetermined pattern of conductor portions and insulating portions. The connecting means includes a connector having a plurality of conductor circuits which are insulated from one another such that opposite ends of the conductors of the conductor circuits can be connected to the terminals and the corresponding conductor portions or insulating portions.

Consequently, the film information terminal portion, provided on the inner wall surface of the patrone chamber, can be electrically connected to the film information contact portion of the small diameter patrone by the single connecting means.

Figure 23:
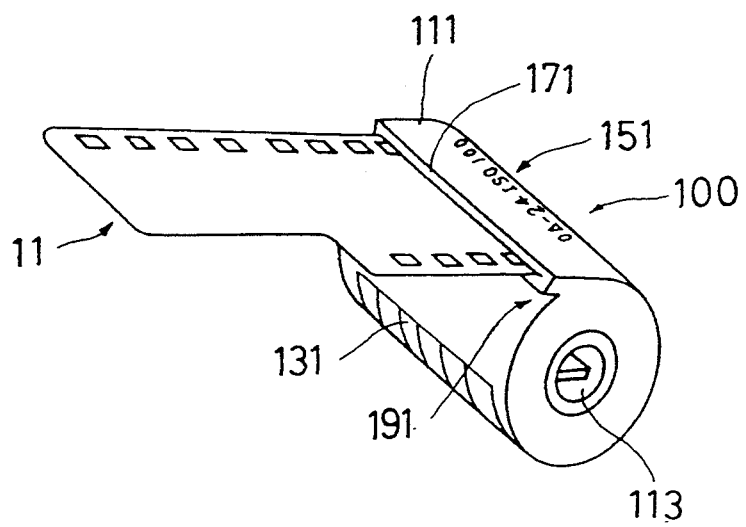
FIG. 23 is a perspective view of a JIS 135 type patrone.
Figure 24:
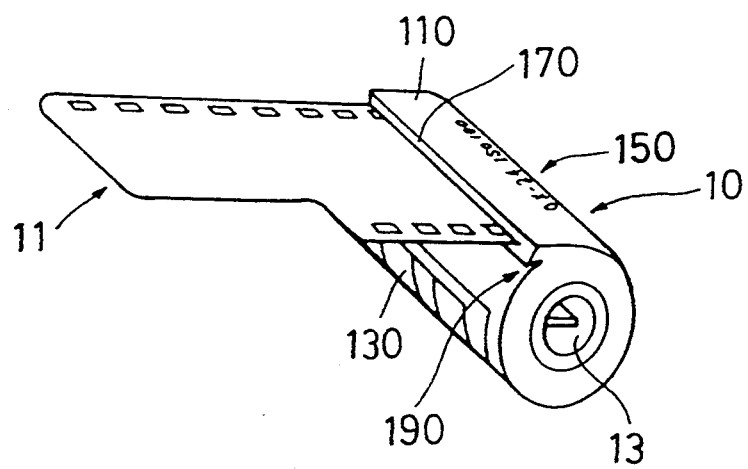
FIG. 24 is a perspective view of a small diameter patrone.

FIGS. 23 and 24 show a perspective view of a JIS 135 type patrone and a small diameter patrone, respectively.

The JIS 135 type patrone 100 (referred to as a standard patrone) shown in FIG. 23 is provided on its outer peripheral surface 111 with film information contacts 131. The contacts provide coded film information, such as film-speed of a film 11 loaded in the standard patrone 100, in accordance with a selective electrical connection of the film information contacts 131. The JIS 135 type patrone 100 is further provided on its outer peripheral surface 111 with an information indicating portion 151 in which letters representing film information, such as the film-speed or the number of frames of the film 11 are printed, a film outlet 171 through which the film is drawn, and a recess 191 in the vicinity of the film outlet 171.

The small diameter patrone 10, as shown in FIG. 24, has a diameter smaller than the standard patrone 100 and is provided with a winding shaft 13 whose diameter is identical to that of the winding shaft 113 of the standard patrone 100.

The small diameter patrone 10 is provided, on the outer peripheral surface 110 thereof, with film information contacts 130 which provide coded film information, such as a film-speed of a film 11 loaded in the small diameter patrone 10, in accordance with a selective electrical connection of the film information contacts. The outer peripheral surface 110 of patrone 10 is further provided with an information indicating portion 150 in which letters representing film information, such as film-speed or the number of printed frames of the film 11, and a film outlet 170 through which the film is drawn. The portion of the outer peripheral surface 110 in the vicinity of the film outlet 170 is provided with a recess 190.

Figure 25:
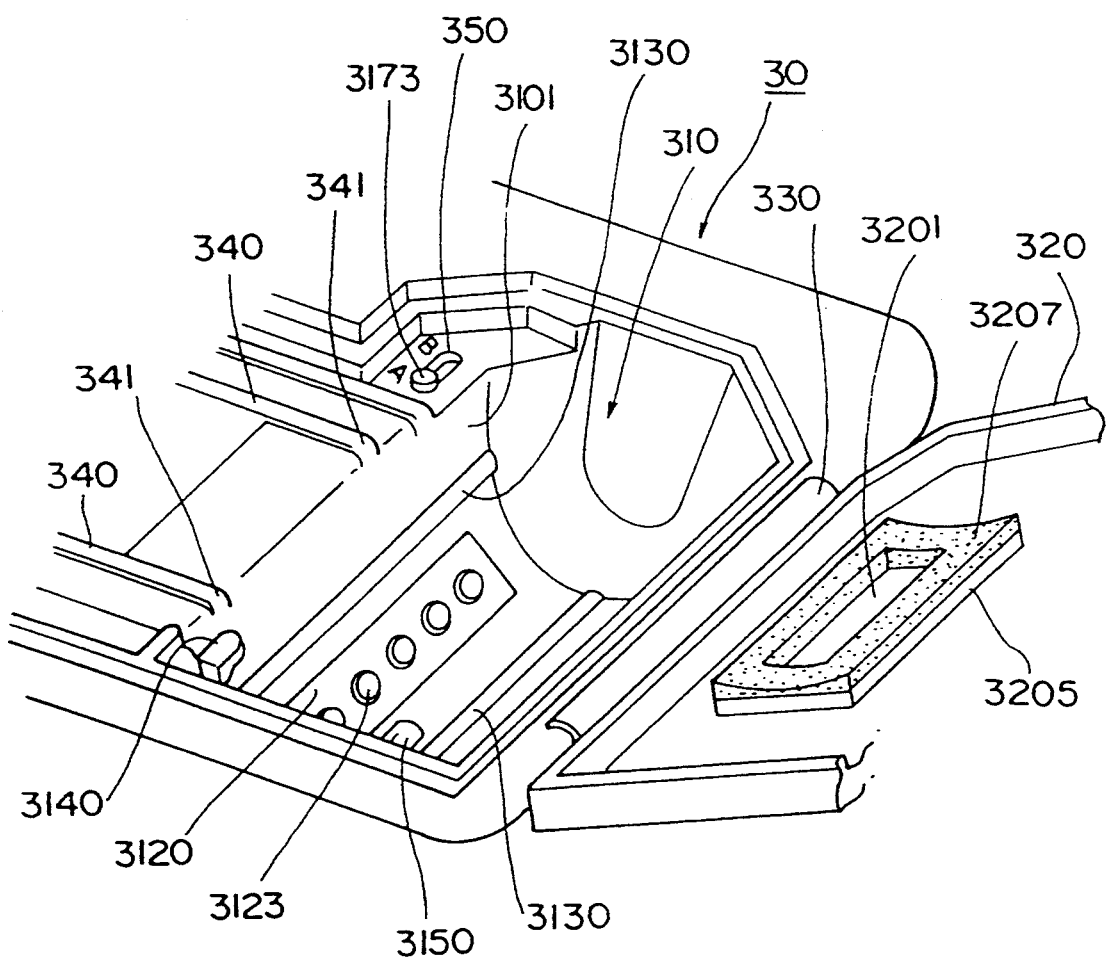
FIG. 25 is a perspective view of main parts of a patrone chamber of a camera according to a tenth embodiment of the present invention.

FIG. 25 shows a perspective view of a patrone chamber of a camera according to a tenth embodiment of the present invention.

In FIG. 25, the camera 30 has a patrone chamber 310 and a back cover 320 which closes the patrone chamber 310. The back cover 320 is at the back surface of the camera body 30 connected to the body 30 by a hinge 330. The back cover 330 is provided with a window 3201 through which the indicating portion 150 or 151 of the standard patrone 100, or the small diameter patrone 10 received in the patrone chamber 310, can be viewed when the back cover 320 is closed.

Figure 26:
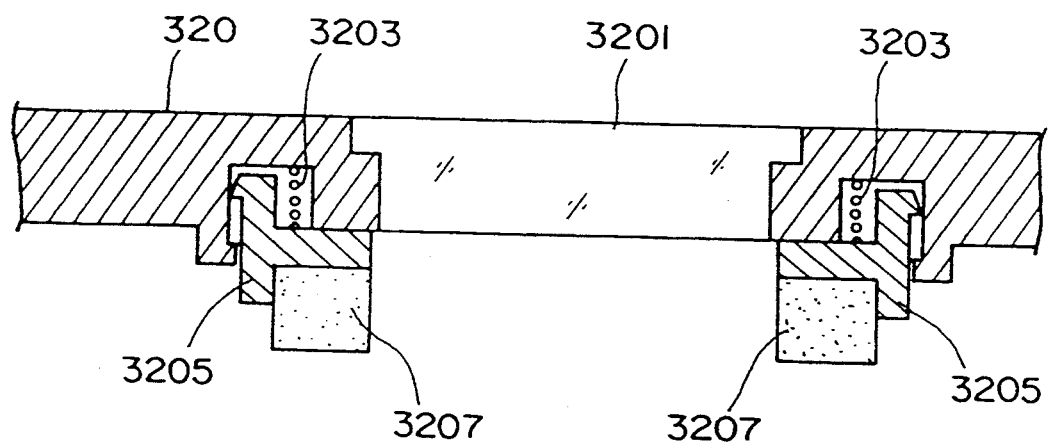
FIG. 26 is an enlarged sectional view of a back cover having a window, shown in FIG. 25.
Figure 27:
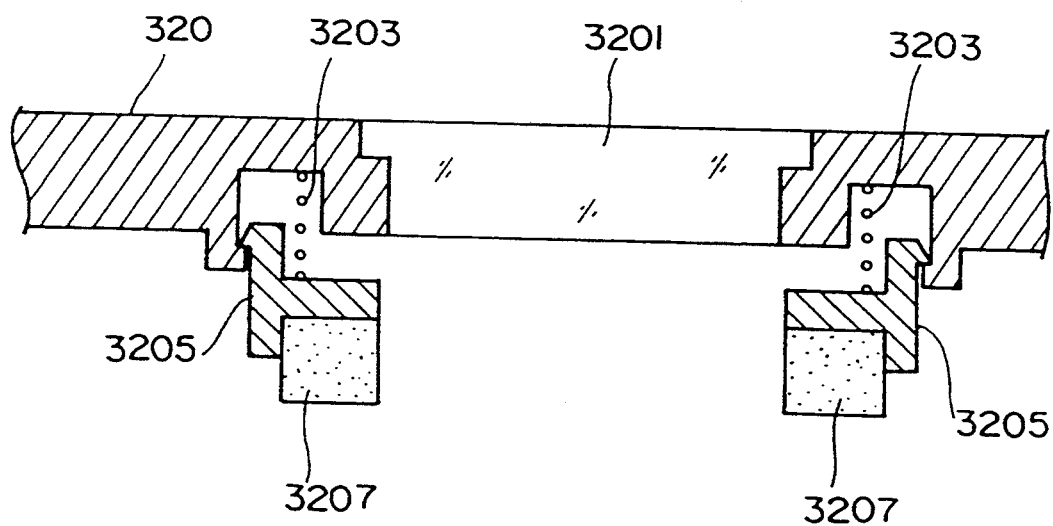
FIG. 27 is an enlarged sectional view of a back cover having a window, shown in a position different from FIG. 26.

The back cover 320 is provided with a seat 3205 which surrounds the window 3201 and which is biased in a direction to project from the back cover by a spring 3203, as can be seen in FIGS. 26 and 27. The seat 3205 is provided thereon with an annular light intercepting member 3207 made of an elastic material to prevent harmful light from entering the camera through the window 3201.

Figure 28:
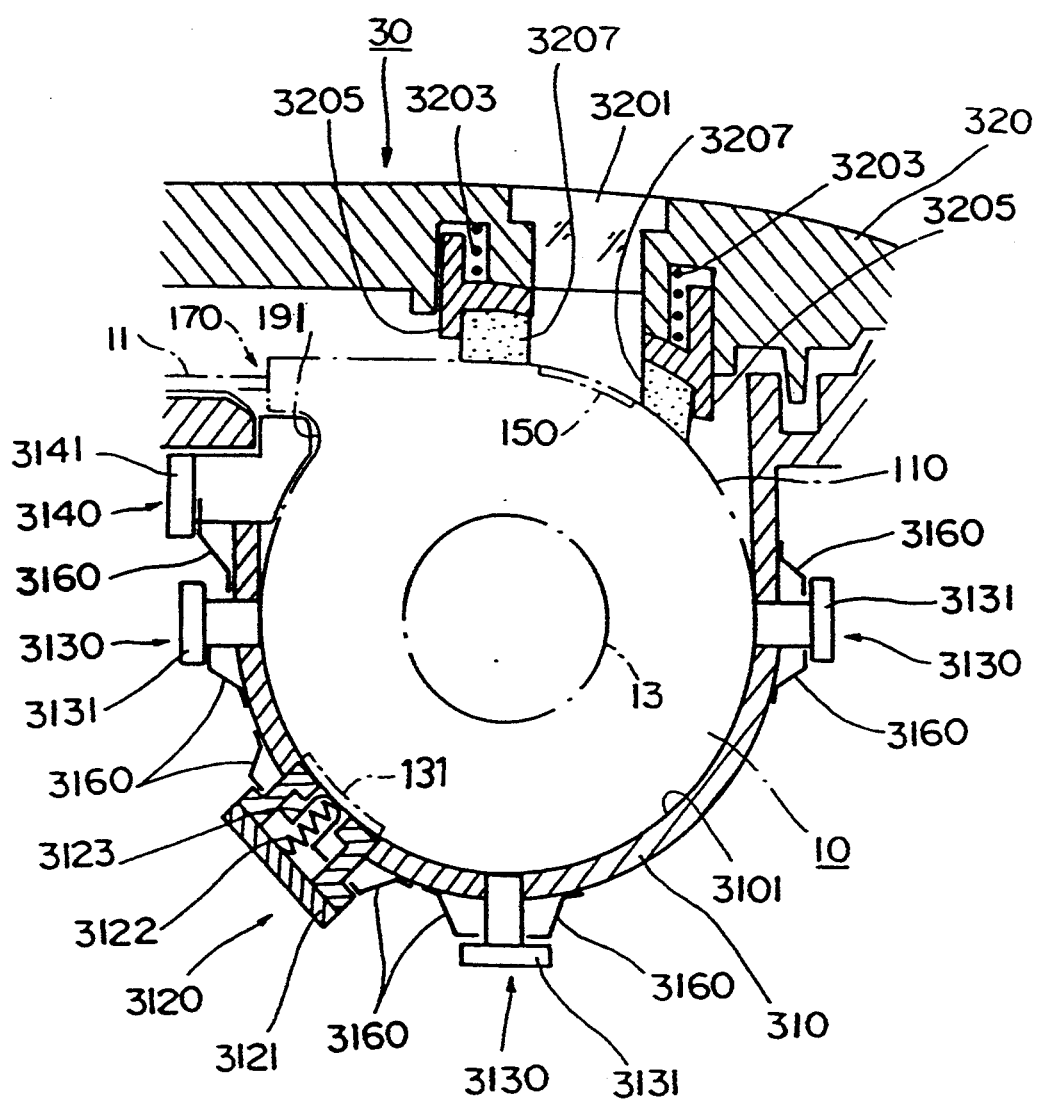
FIG. 28 is a sectional view of a patrone chamber in which a standard patrone is received.

As shown in FIG. 28, the generally U-shaped patrone chamber 310 has a diameter substantially identical to the outer diameter of the standard patrone 100. The patrone chamber 310 is provided on an inner wall surface 3101 thereof with a seat 3120, holding members 3130 and engaging projection 3140, as shown in FIG. 25. The rewinding fork 3150 is provided in the patrone chamber 310 at the bottom thereof to engage with the end of the winding shaft 13 or 113 of the small diameter patrone 10 or standard patrone 100.

Film guides 340 are provided to be connected to the patrone chamber 310 to guide the film drawn from the patrone towards the rewinding spool (not shown), as shown in FIG. 25.

The seat 3120 and the holding members 3130 extend in the axial direction of the winding shaft 113 or 13 of the standard patrone 100 or the small diameter patrone 10 received in the patrone chamber 310. The engaging projection 3140 is located on the bottom of the inner wall surface 3101 of the patrone chamber 310 adjacent to the film guides 340.

The seat 3120, the holding members 3130 and the engaging projection 3140 can be retracted from the patrone chamber 310. To this end, the seat 3120, the holding members 3130 and the engaging projection 3140 have larger diameter heads 3121, 3131 and 3141, respectively, which are located outside the patrone chamber 310 and which are biased by respective springs 3160 to urge radially inward the seat 3120, the holding members 3130 and the engaging projection 3140 into the patrone chamber.

Figure 29:
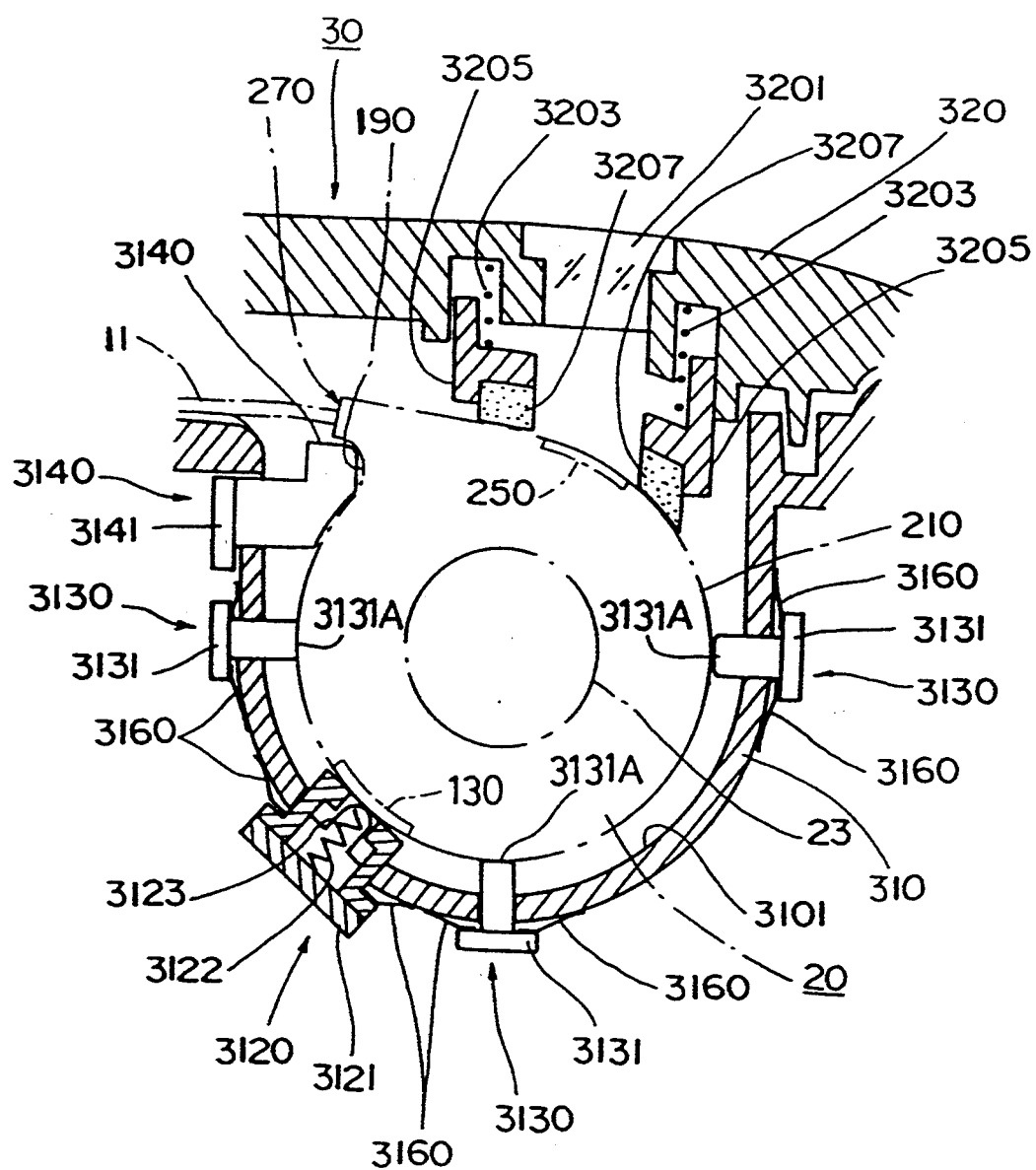
FIG. 29 is a sectional view of a patrone chamber in which a small diameter patrone is received.

The seat 3120 is disposed to face the film information contacts 131 or 130 of the standard patrone 100 or the small diameter patrone 10 when the patrone is received in the patrone chamber 310 (FIGS. 28, 29).

Figure 30:
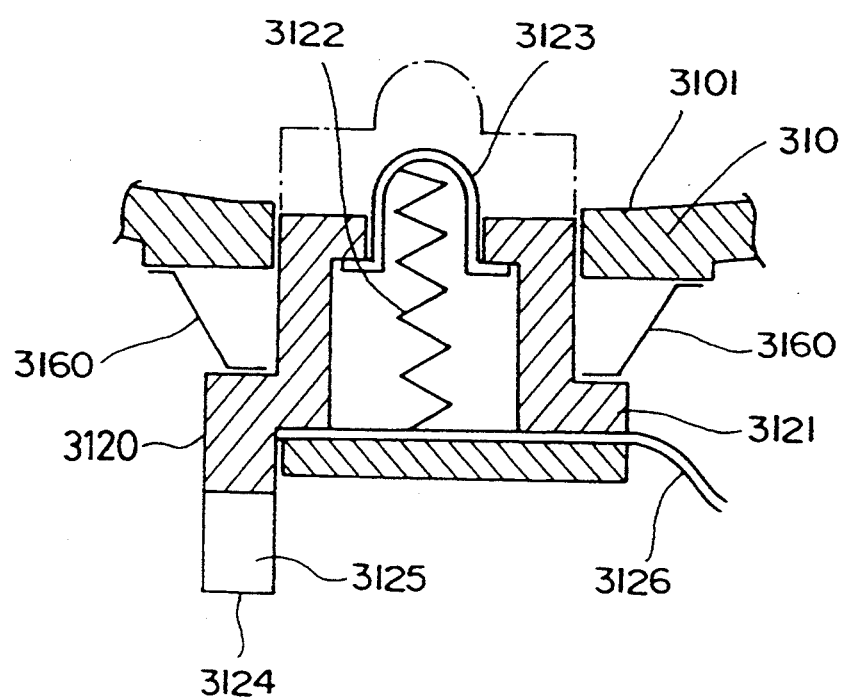
FIG. 30 is an enlarged sectional view of a retractable seat shown in FIG. 28.

As can be seen in FIG. 30, the seat 3120 has a hollow body in which a plurality of terminals 3123 are provided. The terminals 3123 are biased by springs 3122 to project into the patrone chamber 310 from the seat 3120. The terminals 3123 are electrically connected to a film information detector (not shown) by leads 3126 (FIG. 30).

In the illustrated embodiment, the seat 3120 and the holding members 3130 constitute a holder, and the engaging projection 3140 constitutes a positioning member. Moreover, the terminals 3123 and the springs 3160 constitute the film information terminals and the biasing means, respectively.

Figure 31:
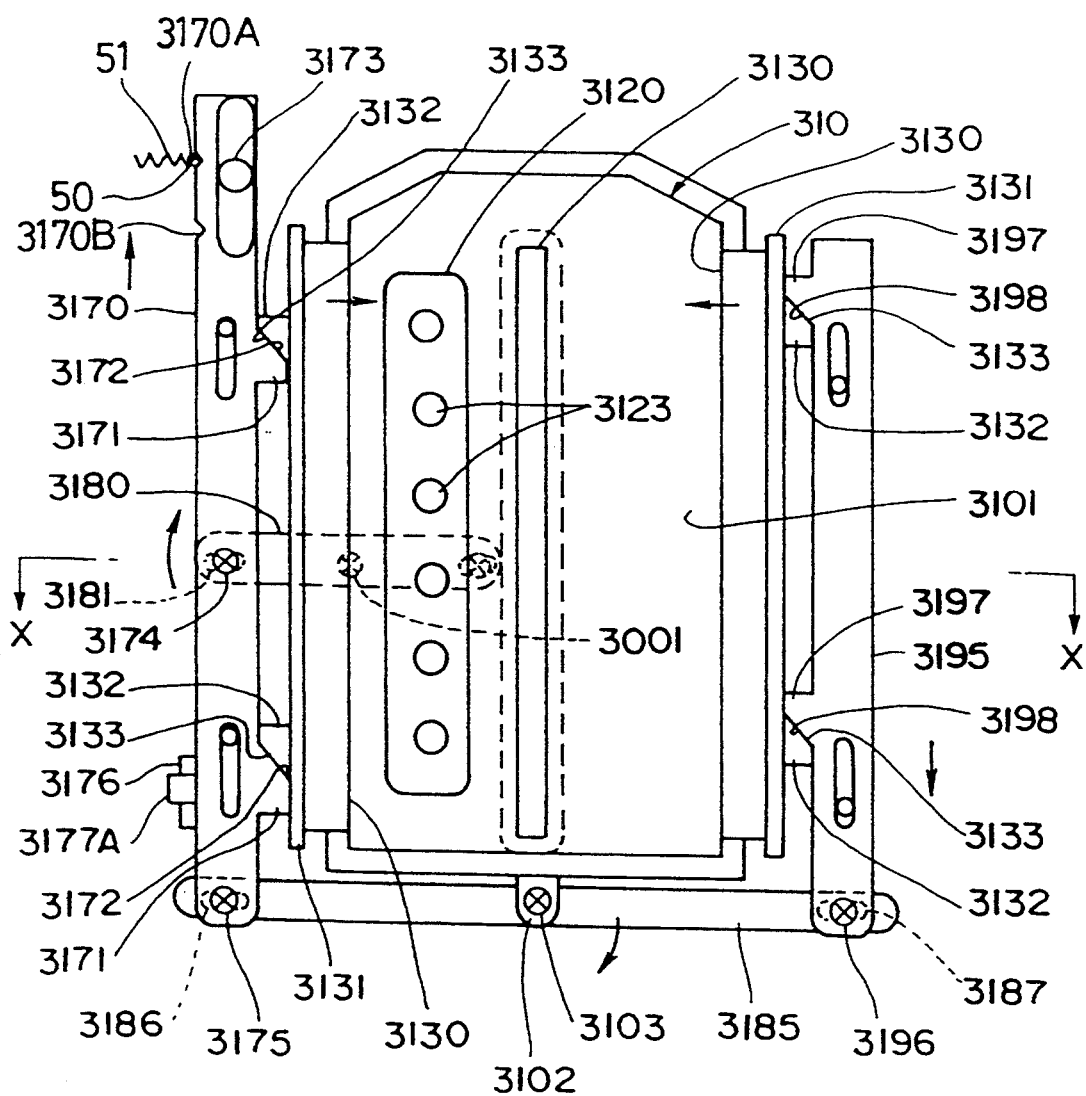
FIG. 31 is a schematic view of a seat, holding members, and an engaging projection shown in FIGS. 28

As can be seen in FIGS. 28 and 31, the heads 3131 of the holding members 3130, provided on the right and left sides of the inner wall surface 3101 of the patrone chamber 310, are provided with cam pieces 3132 which have oblique surfaces 3133. The oblique surfaces 3133 of the left holding member 3130, as shown in FIG. 28, are engaged by corresponding oblique surfaces 3172 of upper and lower cam pieces 3171 provided on a slide arm 3170 which is slidable in the longitudinal direction of the holding members 3130.

The slide arm 3170 is provided on an upper end thereof with a switching lever 3173 projecting therefrom, which extends through an elongated hole 350 formed in the wall portion of the patrone chamber 310 adjacent to one of the film guides 340, so that the front end of the switching lever 3173 is exposed in the vicinity of the patrone chamber 310, as can be seen in FIGS. 25 and 31.

As shown in FIG. 31, the slide arm 3170 is provided on intermediate and lower portions thereof with pins 3174 and 3175 which are fitted in elongated holes 3181 and 3186 formed in swing arms 3180 and 3186, at one end thereof, respectively.

Figure 32:
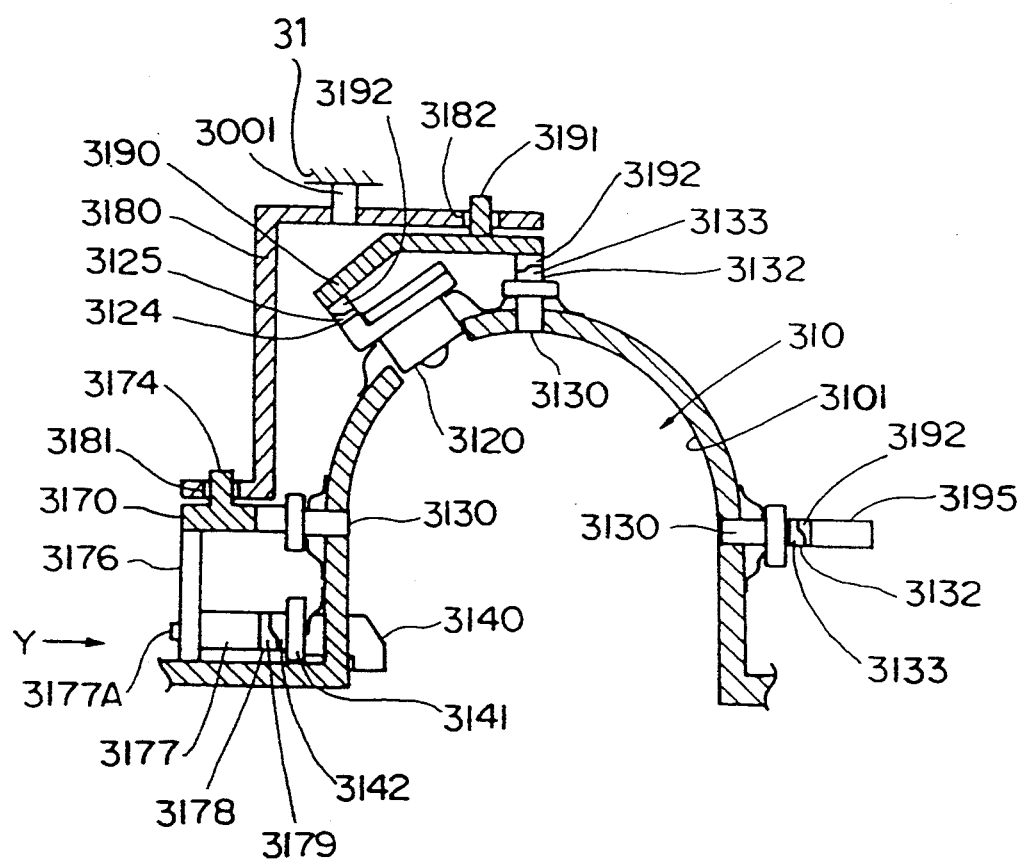
FIG. 32 is a sectional view taken along the line X—X in FIG. 31.

The intermediate portion of the swing arm 3180 is rotatably supported by a pivot pin 3001 provided on camera housing 31 of the camera 30 (FIG. 32). The other end of the swing arm 3180 is provided with an elongated hole 3182 in which a pin 3191, provided on an intermediate portion of a slide arm 3190 which is slidable in the longitudinal direction of the associated holding member 3130, is fitted. Namely, the slide arms 3190 and 3170 slide in association with each other in opposite directions through the swing arm 3180.

The slide arm 3190 is provided on opposite ends thereof with cam pieces 3192 which are identical in shape to the cam pieces 3171 of the slide arm 3170 and which project in a direction opposite to the cam pieces 3171. The oblique surfaces of the cam pieces 3192 are engaged by the oblique surfaces 3125 of the cam piece 3124 provided on the head 3121 of the seat 3120 and the oblique surface 3133 of the lower holding member 3130 (FIG. 28), respectively, as shown in FIG. 32.

The swing arm 3185 is rotatably connected at the intermediate portion thereof to a pivot pin 3103 of a bracket 3102 provided on the rear surface of the bottom of the patrone compartment 310, as shown in FIG. 31. The swing arm 3185 is provided on the other end thereof with an elongated hole 3187 in which a pin 3196 provided on a lower end of a slide arm 3195, slidable in the longitudinal direction of the holding members 3130, is fitted. Namely, the slide arms 3195 and 3170 slide in association with each other in opposite directions through the swing arm 3185.

The slide arm 3195 is provided on upper and lower ends thereof with cam pieces 3197 which are identical in shape to the cam pieces 3171 of the slide arm 3170 and which project in a direction opposite to the cam pieces 3171. The oblique surfaces 3198 of the cam pieces 3197 are engaged by the oblique surfaces 3133 of the right holding member 3132 in FIG. 28.

Figure 33:
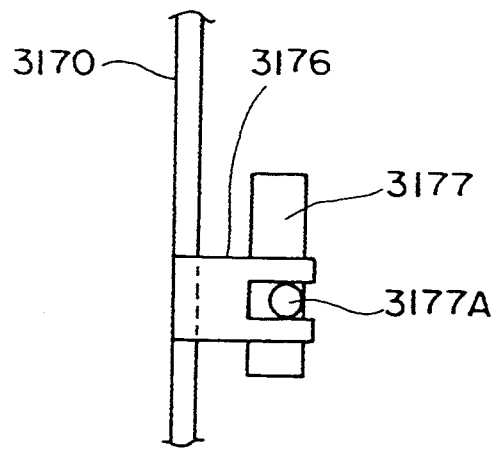
FIG. 33 is an explanatory view of a holding piece of a slide arm shown in FIG. 31.
Figure 34:
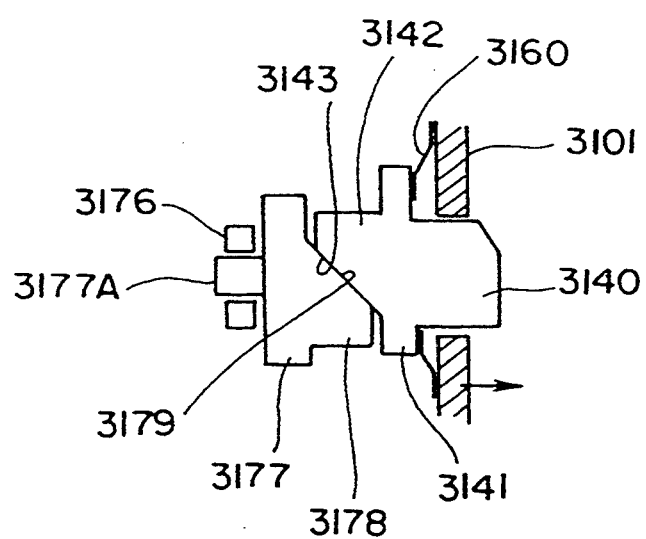
FIG. 34 is a schematic view of an engaging projection and a holding member shown in FIGS. 28 and 29; and, FIG. 35 is a schematic view of a slide arm and a holding member in association with an operation of a switching lever shown in FIG. 31.

The slide arm 3170 is provided on the lower end thereof with a generally L-shaped holding arm 3176 (FIGS. 31, 32, and 33) which holds a pin 3177A of a slide piece 3177 which slides in the same direction as the slide arm 3170, as shown in FIGS. 32, 33 and 34. The slide piece 3177 is provided with a cam piece 3178 identical in shape and direction to the cam pieces 3171 of the slide arm 3170. The cam piece 3178 has an oblique surface 3179 engaged by an oblique surface 3143 of a cam piece 3142 provided on the head 3141 of the engaging projection 3140.

In the illustrated embodiment, the slide arms 3170, 3190 and 3195, the holding piece 3176, the slide piece 3177, and the swing arms 3180 and 3185 constitute a projecting means.

Figure 35:
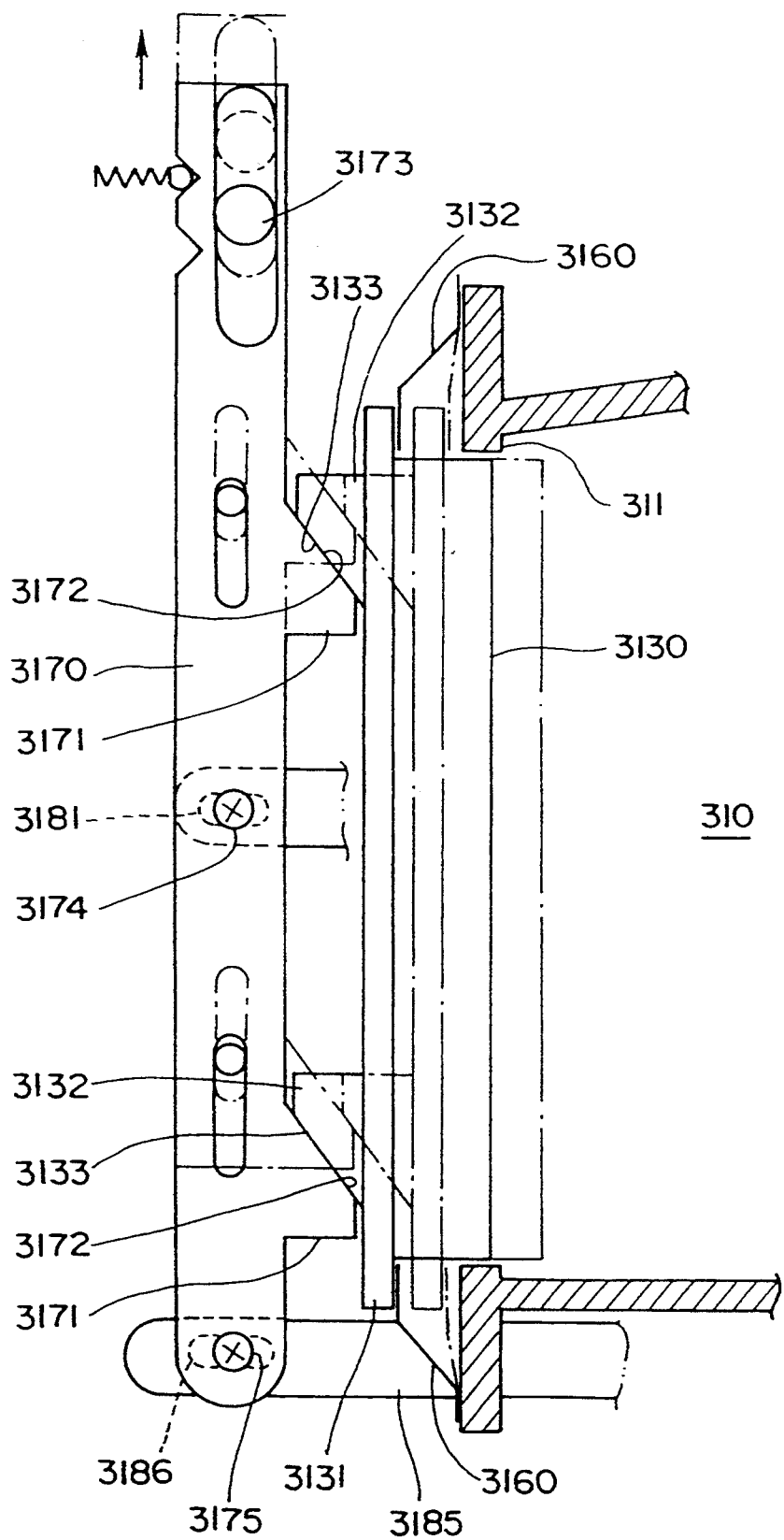

When the small diameter patrone 10 is to be received in the patrone chamber 310, the switching lever 3173, which is exposed to the camera housing 31 in the vicinity of the patrone chamber 310, is slid in and along the elongated hole 350 to a position "B" (i.e., small diameter patrone position) shown in FIG. 25. Consequently, the slide arm 3170 is moved upward, as indicated by an imaginary line in FIG. 35, so that the oblique surfaces 3172 of the cam pieces 3171 of the slide arm 3170 cause the corresponding oblique surfaces 3133 of the cam pieces 3132 of the left holding member 3130, as shown in FIG. 28, to slide thereon. As a result, the left holding member 3130 projects into the patrone chamber 310 from the inner wall surface thereof against the associated spring 3160. Note that when the slide arm 3170 is moved to the position "B", a ball 50, which is biased by a spring 51 held by the camera housing 31, is engaged in a recess 3170B formed on the side surface of the slide arm 3170, so that the latter is held in the position "B", as shown in FIGS. 31 and 35.

The movement of the slide arm 3170 to the position "B" causes the upward movement of the holding piece 3176 and the slide piece 3177, so that the downward movement of the slide arms 3190 and 3195 takes place through the swing arms 3180 and 3185, respectively.

Consequently, the holding members 3130, the seat 3120 and the engaging piece 340 are projected into the patrone chamber 310 through the inner wall surface 311 thereof by the relative slide movement of the oblique surfaces 3179, 3198 of the cam pieces 3178, 3192 and 3197 and the oblique surfaces 3133, 3125 and 3143 of the cam pieces 3132, 3124 and 3142 of the heads 3131, 3132 and 3141 of the intermediate and right holding members 3130 in FIG. 28, the seat 3120 and the engaging projection 3140, respectively.

Note that the amount of projection of the seat 3120, the holding members 3130 and the engaging projection 3140 from the inner wall surface of the patrone chamber is identical to the difference in diameter between the standard patrone 100 and the small diameter patrone 10.

When the small diameter patrone 10 is fitted in the patrone chamber 310, the seat 3120 and the front ends 3131A of the holding members 3130, projecting into the patrone chamber 310, come into contact with the outer peripheral surface 210 of the small diameter patrone 10, as shown in FIG. 29. Consequently, the small diameter patrone 10 is firmly held in the patrone chamber, so that the end of the winding shaft 13 of the small diameter patrone 10 is engaged by the rewinding fork 3150 of the patrone chamber 310.

The terminals 3123 projecting from the seat 3120 which in turn projects into the patrone chamber 310 with the help of the springs 3122 are brought into contact with the film information contacts 130 of the small diameter patrone 10, so that the terminals 3123 connected to the conductor pattern of the film information contacts 130 are electrically interconnected to detect the film information by the information detector (not shown) through the leads 3126, as shown in FIG. 29.

Furthermore, the engaging projection 3140 projecting into the patrone chamber 310 is engaged in the recess 190 of the small diameter patrone 10. Consequently, the small diameter patrone 10 is positioned in the patrone chamber 310 so that the film outlet 170 of the small diameter patrone 10 is oriented towards ends 341 (FIGS. 25, 29) of the film guides 340 that are located adjacent to the patrone chamber 310.

When the back cover 320 is closed, the window 3201 provided therein is opposed to the indicating portion 150 of the small diameter patrone 10, and the light intercepting member 3207 provided on the seat 3205, biased by the spring 3203 to project from the inner surface of the back cover 320, is depressed against the indicating portion 150 of the small diameter patrone 10.

On the other hand, when the standard patrone 100 is to be fitted in the patrone chamber 310, the switching lever 3173 is moved in and along the elongated hole 350 to a standard diameter position "A" (FIG. 25).

Consequently, the slide arm 3170 is moved downward, as indicated by a solid line in FIG. 35, so that the lower movement of the holding piece 3176 and the slide piece 3177 and the upward slide of the slide arms 3190 and 3195 take place. As a result, the holding members 3130, the seat 3120 and the engaging projection 340 are retracted from the patrone chamber by the spring force of the springs 3160. Note that when the switching lever is moved to the position "A", the ball 50 is engaged in a recess 3170A formed in the side surface of the left slide arm 3170, so that the switching lever 3173 is held in the position "A".

When the standard patrone 100 is received in the patrone chamber 310, the outer wall surface 111 of the standard patrone 100 comes into contact with the inner wall surface 3101 of the patrone chamber 310, as shown in FIG. 28. Consequently, the standard patrone 100 is firmly held in the patrone chamber, so that the end of the winding shaft 113 of the standard patrone 100 is engaged by the rewinding fork 3150 of the patrone chamber 310.

The terminals 3123, biased by the springs 3122 to project from the seat 3120 which is retracted from the patrone chamber 310, are brought into contact with the film information contacts 131 of the standard patrone 100, so that the terminals 3123, connected to the conductor pattern of the film information contacts 131, are electrically interconnected to detect the film information by the information detector (not shown) through the leads 3126, as shown in FIG. 28.

Furthermore, the engaging projection 3140 in the retracted position is engaged in the recess 191 of the standard patrone 100. Consequently, the standard patrone 100 is positioned in the patrone chamber 310 so that the film outlet 171 of the standard patrone 100 is oriented to the ends 341 (FIGS. 25, 29) of the film guides 340 that are located adjacent to the patrone chamber 310.

When the back cover 320 is closed, the window 3201, provided therein, is opposed to the indicating portion 151 of the standard patrone 100, and the light intercepting member 3207 provided on the seat 3205 biased by the spring 3203 is depressed against the indicating portion 151 of the standard patrone 100.

As can be seen from the foregoing, in the camera 30 according to the present invention, since the seat 3120 and the holding members 3130 are retractably projected from the inner wall surface 3101 of the patrone chamber 310 and are moved between a retracted position and a projecting position by the switching lever 3173, the standard patrone 100 and the small diameter patrone 10 can be selectively accommodated in the patrone chamber 310 such that the end of the winding shaft 13 or 113 thereof can be engaged by the rewinding fork 3150 of the patrone chamber 310.

According to the present invention, since the engaging projection 3 140 is retractably provided on the inner wall surface 3101 of the patrone chamber 310 and is moved between a retracted position and a projecting position by the switching lever 3173, the engaging projection 3140 can be engaged in the recess 191 or 190 of the standard patrone 100 or small diameter patrone 10, so that the film outlet 171 or 170 of the standard patrone 100 or the small diameter patrone 10 can be oriented towards ends 341 of the film guides 340 that are located adjacent to the patrone chamber 310.

Accordingly, no winding of the film 11 drawn from the standard patrone 100 or small diameter patrone 10, through the film outlet 171 or 170 towards the film guides 340, occurs. This reduces the winding and rewinding force of the film and prevents the film surface from being damaged, due to the flatness of the film surface.

According to the present invention, since the terminals 3123, provided in the seat 3120 which retractably projects from the inner wall surface 3101 of the patrone chamber 310, are biased to project from the seat, the terminals 3123 can be effectively brought into contact with the film information contacts 131 or 130 of the standard patrone 100 or small diameter patrone 10.

Consequently, when the standard patrone 100 or small diameter patrone 10 is received in the patrone chamber 310, film information, such as film-speed of the associated film 11 can be automatically detected on the camera body side. In addition to the foregoing, according to the present invention, since the seat 3205 is provided on the inner surface of the back cover 320 of the camera to surround the window 3201 and is biased to project therefrom, and since the light intercepting member 3207 made of an elastic material is provided on the seat, no harmful light enters the patrone chamber 310 through the window 3201 from the outside of the camera 30, so that film 11, drawn from the standard patrone 100 or the small diameter patrone 10 through the film outlet 171 or 170, is not exposed.

Furthermore, since the switching lever 3173 is provided in the portion of the camera housing that is exposed when the back cover is opened, in the vicinity of the patrone chamber 310 to project the seat 3120, the holding members 3130, and the engaging projection 3140 from the inner wall surface 3101 of the patrone chamber 310, mal-operation of the switching lever, thus leading to a breakage of the internal mechanism of the camera does not occur after the patrone is received in the patrone chamber.

Although the seat 3120, the holding members 3130, and the engaging projection 3140 are biased by the springs 3160 into the retracted position and are moved to the projecting position by the switching lever 3173 through the slide arms 3170, 3190, and 3195, the holding piece 3176, the slide piece 3177, the swing arms 3180 and 3185, in association with the operation of the switching lever 3173 in the illustrated embodiment, it is alternatively possible to continuously bias all or some of the seat 3120, the holding members 3130, and the engaging projection 3140 into the projecting position by the respective springs. In this alternative, the seat 3120, the holding members 3130, and the engaging projection 3140 are moved to the respective retracted position against the respective springs by the standard patrone 100 or the small diameter patrone 10 when the patrone is received in the patrone chamber 310.

Although the retractable light intercepting member 3207, seat 3120, terminals 3123, holding members 3130 and engaging projection 3140 are provided in the camera in the illustrated embodiments, some of them can be dispensed with.

I claim:

1. An adaptor for supporting a film patrone having a smaller diameter than that of a patrone chamber of a camera, said adaptor being provided between said small diameter film patrone and said patrone chamber so as to adapt said patrone for use in the camera, said adaptor comprising:
   a supporting portion for supporting said small diameter film patrone in said patrone chamber, said supporting portion having a flexible holding portion;
   a positioning portion that is adapted to engage with at least one portion of said patrone chamber; and
   means for detachably attaching said supporting portion to an outer peripheral surface of said small diameter film patrone.

2. An adaptor according to claim 1, said adaptor further comprising a patrone slip preventing means provided between an inner peripheral surface of said adaptor and the outer peripheral surface of said small diameter film patrone to prevent movement of said small diameter film patrone with respect to said adaptor.

3. An adaptor according to claim 2, further comprising:
   an adaptor slip preventing means provided between an outer peripheral surface of said adaptor and an inner peripheral surface of said patrone chamber to prevent movement of said adaptor with respect to said patrone chamber.

4. An adaptor according to claim 1, wherein said adaptor is provided between said patrone chamber and a small diameter patrone which is provided with a film information indicating portion on an outer peripheral surface thereof, and wherein said patrone chamber is enclosed by a back cover of a camera having an information indicating window, said adaptor further comprising:
   a window on a portion thereof which is located between said information indicating window of the back cover and said film information indicating portion of said small diameter patrone when said patrone chamber is enclosed by the back cover.

5. An adaptor according to claim 1, further comprising:
   a light intercepting member provided around a window of said adaptor and on a portion thereof opposed to the outer peripheral surface of said small diameter patrone, said light intercepting member being brought into contact with the outer peripheral surface of said small diameter patrone.

6. An adaptor according to claim 1, wherein when said small diameter patrone is loaded together with said adaptor in said patrone chamber of the camera, said adaptor holds said small diameter patrone in a manner such that a film outlet of said small diameter patrone faces an end of a film guide of said camera adjacent to said patrone chamber.

7. An adaptor according to claim 1, further comprising:
   a film outlet through which a film loaded in said small diameter patrone is withdrawn; and,
   guide rails which project from said film outlet and which come into contact with portions of the film that are located outside a picture plane on opposite sides of the film.

8. An adaptor according to claim 1, further comprising:
   an adaptor securing means for securing said adaptor to said patrone chamber.

9. An adaptor according to claim 8, wherein said adaptor is provided with a screw insertion hole in which a set screw can be inserted.

10. An adaptor according to claim 9, wherein said adaptor securing means comprises a threaded hole in which a set screw inserted in said screw insertion hole can be engaged.

11. An adaptor according to claim 8, wherein said adaptor is provided on the outer peripheral surface thereof with a first engaging member.

12. An adaptor according to claim 11, wherein said adaptor securing means comprises a second engaging member which can be engaged with said first engaging member of said adaptor.

13. An adaptor according to claim 8, wherein said adaptor is provided on the outer peripheral surface thereof with a first planar fastener.

14. An adaptor according to claim 13, wherein said adaptor securing means comprises a second planar fastener which comes into contact with said first planar fastener.

15. An adaptor for use in a camera, said adaptor being provided between a patrone chamber of the camera and a film patrone having a smaller diameter than that of said patrone chamber and supported in said adaptor, said adaptor comprising:
   a patrone holding portion which is accommodated in said patrone chamber, said patrone holding portion including an insertion opening so that said small diameter film patrone may be inserted and held in said patrone holding portion; and
   a lid portion which is integrally connected to said patrone holding portion and swingable to open and close said insertion opening of said patrone holding portion.

16. An adaptor according to claim 15, wherein said camera is provided with a back cover pivotable with respect to said camera to open and close the patrone chamber.

17. An adaptor according to claim 16, wherein a connection of said patrone holding portion and said lid portion is located adjacent to a pivotable portion of said back cover, so that said lid portion can be opened in a same direction as said back cover.

18. An adaptor according to claim 15, wherein said patrone chamber is provided therein with a rewinding fork which can be engaged with a winding shaft of said small diameter patrone, and wherein said patrone holding portion is provided with a recess corresponding to said rewinding fork.

19. An adaptor provided between an inner wall surface of a patrone compartment and an outer peripheral surface of a film patrone having a smaller diameter than that of a film patrone adapted to be received by said patrone compartment, said adaptor comprising:

a supporting portion for supporting said small diameter film patrone in said patrone chamber; and means for electrically connecting a film information terminal portion provided on the inner wall surface of said patrone compartment with a film information contact portion provided on the outer peripheral surface of said small diameter film patrone.

20. An adaptor according to claim 19, wherein said film information terminal portion includes a plurality of terminals, and wherein said film information contact portion includes a plurality of conductor portions separated by insulating portions.

21. An adaptor according to claim 20, wherein said connecting means comprises a connector having a plurality of conductors insulated from one another, each conductor being capable of connecting to said terminals of said film information terminal portion and corresponding conductor portions or insulator portions of said film information contact portion at opposite ends of said conductors.

22. A camera, comprising:
a film patrone chamber having a predetermined diameter for receiving film patrones; and
a patrone holder provided in said film patrone chamber to hold a film patrone, said holder comprising means for supporting film patrones of various diameters so that film patrones of different diameters, including a film patrone having a smaller diameter than that of said patrone chamber, may be used in said camera.

23. A camera according to claim 22, wherein said holder is provided with film information terminals.

24. A camera according to claim 23, further comprising a film guide adjacent to said patrone chamber.

25. A camera according to claim 24, wherein said supporting means comprises a plurality of holding members, a portion of which guide said patrone such that a film outlet of said patrone is oriented toward said film guide.

26. A camera according to claim 22, wherein said supporting means comprises at least one holding member, means for biasing said holding member outwardly from an inner wall surface of said patrone chamber, and projecting means for projecting said holding member into said patrone compartment against said biasing means.

27. A camera according to claim 26, further comprising:
a biasing means for biasing said holding member into said patrone chamber.

28. A camera according to claim 26, further comprising:
a back cover which closes said patrone chamber.

29. A camera according to claim 28, further comprising:
a retractable light intercepting means provided on said portion of said back cover that faces said patrone chamber when the latter is closed by said back cover.

30. A camera according to claim 29, wherein said projecting means comprises a switching lever which is actuated to project said holding member into said patrone chamber and which is provided on a portion of said camera that is exposed to the outside only when said back cover is opened.

31. An adaptor according to claim 1, wherein said adaptor further comprises an end projection arranged to contact a top edge of an inner wall surface of said patrone chamber in a flush manner.

32. An adaptor according to claim 15, wherein said adaptor further comprises an end projection arranged to contact a top edge of an inner wall surface of said patrone chamber in a flush manner.

33. An adaptor according to claim 19, wherein said adaptor further comprises an end projection arranged to contact a top edge of an inner wall surface of said patrone compartment in a flush manner.

* * * * *